United States Patent [19]
Barak et al.

[11] Patent Number: 6,055,556
[45] Date of Patent: Apr. 25, 2000

[54] APPARATUS AND METHOD FOR MATRIX MULTIPLICATION

[75] Inventors: Itzhak Barak, Tel Aviv; Jacob Kirschenbaum, Hadera; Yacov Efrat, Omer, all of Israel; Shao-Wei Pan, Lake Zurich, Ill.

[73] Assignee: Motorola, Inc., Schaumburg, Ill.

[21] Appl. No.: 08/912,224

[22] Filed: Aug. 15, 1997

[51] Int. Cl.[7] .............................. G06F 7/00; G06F 7/52
[52] U.S. Cl. ........................ 708/607; 708/517; 708/622
[58] Field of Search ..................... 364/748.17, 754.01, 364/754.02, 754.03, 748.2, 758, 759; 708/517, 607, 622

[56] References Cited

U.S. PATENT DOCUMENTS

| | | | |
|---|---|---|---|
| 4,354,249 | 10/1982 | King et al. | 364/754.03 |
| 5,204,830 | 4/1993 | Wang et al. | 364/754.02 |
| 5,226,002 | 7/1993 | Wu et al. | 364/754.02 |

*Primary Examiner*—Chuong Dinh Ngo
*Attorney, Agent, or Firm*—James E. Gauger

[57] ABSTRACT

A system (400) alternatively performs real matrix operation in a first mode or performs complex matrix multiplication in a second mode. One input matrix (e.g., {B}) stays in a plurality of memory fields (430-k), while the other input matrix (e.g., {A}) is loaded into a plurality of registers (410-k). Parallel operating groups (405-k, 409-(k+1)) combine elements of {A} with elements of {B}. The groups (405-k, 409-(k+1)) comprise the memory fields (430-k), the registers (410-k) as well as computational units (440-k), switches (420-k) and adder units (460-k). The adder units (460-k) are configured by the switches (420-k) to operate as adders or to operate as accumulators, depending on the mode. Adders provide intermediate results and accumulators accumulate these intermediate results (e.g., Sum) to elements of the resulting matrix {C}. For complex multiplication, real (Re) and imaginary (Im) parts of matrix elements are in processed in adjacent groups. The system (400) uses logarithmic representations of the matrix elements and further comprises a log converter (490) and a plurality of inverse log converters (450-k).

13 Claims, 15 Drawing Sheets

APPARATUS AND METHOD FOR MATRIX MULTIPLICATION

RELATED INVENTIONS

The present invention is related to the commonly assigned United States applications:

[1] "Method and System for Performing a Convolutional Operation", having Ser. No. 08/535,800 filed on Sep. 28, 1995; now U.S. Pat. No. 5,951,628.

[2] "Logarithm/Inverse-Logarithm Converter and Method of Using Same", having Ser. No. 08/381,368, filed on Jan. 31, 1995; now U.S. Pat. No. 5,642,305.

[3] "Logarithm/Inverse-Logarithm Converter Utilizing Second-Order Term and Method of Using Same", having Ser. No. 08/382,467, filed on Jan. 31, 1995; now U.S. Pat. No. 5,703,801.

[4] "Logarithm/Inverse-Logarithm Converter Utilizing Linear Interpolation and Method of Using Same", having Ser. No. 08/391,880, filed on Feb. 22, 1995; now U.S. Pat. No. 5,600,581.

[5] "Logarithm/Inverse-Logarithn Converter Utilizing a truncated Taylor Series and Method of Use Thereof", having Ser. No. 08/381,167, filed on Jan. 31, 1995; now U.S. Pat. No. 5,604,691.

[6] "Logarithm/Inverse-Logarithm Converter Utilizing Offset and Method of Use Thereof", having Ser. No. 08/508,365, filed on Jul. 28, 1995; now U.S. Pat. No. 5,629,884 and

[7] "Exponentiator Circuit Utilizing Shift Register and Method of Using Same", having Ser. No. 08/401,515, filed on Mar. 10, 1995 now U.S. Pat. No. 5,553,012.

The subject matter of the above-identified related inventions is hereby incorporated by reference into the disclosure of this invention.

FIELD OF THE INVENTION

The present invention relates generally to digital signal processing and, in particular, to a method and a system for multiplication of complex and real matrices on a parallel architecture.

BACKGROUND OF THE INVENTION

Computer processors are well known and widely used for a variety of purposes. One application of computer processors is digital signal processing (DSP). Digital signal processing is concerned with the representation of signals by sequences of numbers or symbols and the processing of these signals. DSP has a wide variety of applications and its importance is evident in such fields as pattern recognition, radio communication, telecommunications, radar, biomedical engineering, and many others. For DSP, it is often required to perform complex matrix multiplication and real matrix multiplication.

For convenience, abbreviations and mathematical expressions are defined as they will be used in the following.

Numbers a, b, c, or in general x, can be in a real domain ($x \in \Re$) ("real numbers") and in a complex domain ($\underline{x} \in \Im$) ("complex numbers"). The real domain $\Re$ is a subdomain of the complex domain $\Im$ ($\Re \subset \Im$) so that any real number x is also a complex number $\underline{x}$. For convenience of distinction, complex numbers $\underline{x}$ are underscored, wherein real numbers are not underscored.

Real numbers x ($x \in \Re$) such as e.g., a=5.2, b=−7.8, or c=−40.56 are combined by real multiplication (*) according to:

$$c = a*b \quad (1)$$

Complex numbers $\underline{x}$ ($\underline{x} \in \Im$), such as e.g., $\underline{x}=\underline{a}$, $\underline{b}$, or $\underline{c}$, are defined as pairs [Re($\underline{x}$), Im($\underline{x}$)] having a real part Re($\underline{x}$) and an imaginary part Im($\underline{x}$), wherein Re and Im are numbers in the real domain (Re, Im$\in \Re$).

By complex multiplication (*), two complex numbers $\underline{a}$ and $\underline{b}$ are combined to $\underline{c}$:

$$\underline{c} = \underline{a}*\underline{b} \quad (2)$$

Thereby, the real parts Re($\underline{a}$) and Re($\underline{b}$) of $\underline{a}$ and $\underline{b}$ and the imaginary parts Im($\underline{a}$) and Im($\underline{b}$) of $\underline{a}$ and $\underline{b}$ are combined to the real part Re($\underline{c}$) of $\underline{c}$ according to:

$$Re(\underline{c}) = +Re(\underline{a})*Re(\underline{b}) - Im(\underline{a})*Im(\underline{b}) \quad (3)$$

and combined to the imaginary part Im($\underline{c}$) of $\underline{c}$ according to:

$$Im(\underline{c}) = +Re(\underline{a})*Im(\underline{b}) + Im(\underline{a})*Re(\underline{b}). \quad (4)$$

For convenience, equations (3) and (4) are written by real factors $f_1$, $f_2$, $f_3$, and $f_4$ ($f \in \Re$):

$$Re(\underline{c}) = f_1 + f_2 \quad (5)$$

with $$f_1 = +Re(\underline{a})*_1 Re(\underline{b}) \quad (6)$$

$$f_2 = -Im(\underline{a})*_2 Im(\underline{b}) \quad (7)$$

$$Im(\underline{c}) = f_3 + f_4 \quad (8)$$

with $$f_3 = +Re(\underline{a})*_3 Im(\underline{b}) \quad (9)$$

$$f_4 = +Im(\underline{a})*_4 Re(\underline{b}). \quad (10)$$

wherein subscripts 1–4 under the multiplication sign * ($*_1$, $*_2$, $*_3$, and $*_4$) are indices for 4 required multiplication operations. Real multiplication is a special case of complex multiplication wherein all Im are Im=0.

Pluralities of numbers (e.g., complex $\underline{x}$ or only real x) which are arranged in a one-dimensional plurality can be expressed by vectors $\{\underline{X}\}_V$ with the subscript "V" for vector. In connection with vectors, numbers $\underline{x}$ are called vector elements and have at least one index, e.g., n=1 to N. Complex vector $\{\underline{X}\}_V$ having complex $\underline{x}$ can be written as:

$$\{\underline{X}\}_V = \{\underline{x}(1)\underline{x}(n)\underline{x}(N)\} \quad (11)$$

or with real parts Re in a separate real part vector as:

$$\{Re(\underline{X})\}_V = \{Re(\underline{x}(1))Re(\underline{x}(n))Re(\underline{x}(N))\} \quad (12)$$

and imaginary parts Im in a separate imaginary part vector as:

$$\{Im(\underline{X})\}_V = \{Im(\underline{x}(1))Im(\underline{x}(n))Im(\underline{x}(N))\} \quad (13)$$

Real vectors $\{X\}_V$ having real x can be written as:

$$\{X\}_V = \{\underline{x}(1)\underline{x}(n)\underline{x}(N)\} \quad (14)$$

Pluralities of numbers (e.g., complex $\underline{x}$ or only real x) can also be arranged in a two-dimensional plurality and expressed as matrices with rows and columns. Numbers $\underline{x}$, here called matrix elements $\underline{x}$, can have row indices (e.g., i=1 to I, or n=1 to N) and column indices (e.g., j=1 to J, or n=1 to N). For convenience, indices are written in the order (row index, column index). The terms "row" and "column" are convenient abbreviations indicating a first and a second arrangement dimension. For example, complex matrix $\{\underline{X}\}$ has i=1 to I rows and j=1 to J columns:

$$\{\underline{X}\} = \begin{vmatrix} \underline{x}(1,1)... & \underline{x}(1,j)... & \underline{x}(1,J) \\ \underline{x}(i,1)... & \underline{x}(i,j)... & \underline{x}(i,J) \\ \underline{x}(I,1)... & \underline{x}(I,j)... & \underline{x}(I,J) \end{vmatrix} \quad (15)$$

Matrix $\{\underline{X}\}$ has a number of e.g., I row vectors with each e.g., J elements $\underline{x}(i,j)$ with a common row index (e.g., i). For example, row vector $\{\underline{X}\}_V(i)$ comprises elements $\underline{x}(i,j)$:

$$\{\underline{X}\}_V(i) = \{\underline{x}(i,1) \ldots \underline{x}(i,j) \ldots \underline{x}(i,J)\} \quad (16)$$

Similarly, matrix $\{\underline{X}\}$ has a number of e.g., J column vectors of e.g., I elements $\underline{x}(i,j)$ with a common column index (e.g., j). For example, column vector $\{X\}_V(j)$ comprises elements $\underline{x}(i,j)$:

$$\{\underline{X}\}_V(j) = \{\underline{x}(1,j)\underline{x}(i,j)x(I,j)\} \quad (17)$$

For a complex matrix $\{\underline{X}\}$, real parts $Re(\underline{x})$ and imaginary parts $Im(\underline{x})$ of matrix elements $\underline{x}$ can be considered separately. Matrix $\{\underline{X}\}$ has a real part matrix $\{Re(\underline{X})\}$ and a imaginary part matrix $\{Im(\underline{X})\}$:

$$Re(\underline{x}(1,1))Re(\underline{x}(1,j))Re(\underline{x}(1,J)) \quad (18)$$

$$\{Re(\underline{X})\} = Re(\underline{x}(i,1))Re(\underline{x}(i,j))Re(\underline{x}(i,J))$$

$$Re(\underline{x}(I,1))Re(\underline{x}(I,j))Re(\underline{x}(I,J))$$

$$Im(\underline{x}(1,1))Im(\underline{x}(1,j))Im(\underline{x}(1,J)) \quad (19)$$

$$\{Im(\underline{X})\} = Im(\underline{x}(i,1))Im(\underline{x}(i,j))Im(\underline{x}(i,J))$$

$$Im(\underline{x}(I,1))Im(\underline{x}(I,j))Im(\underline{x}(I,J))$$

In a vector classification, matrix $\{\underline{X}\}$ comprises e.g., J real part row vectors $$\{Re(\underline{X})\}_V(i) = \{Re(\underline{x}(i,1))Re(\underline{x}(i,n))Re(\underline{x}(i,N))\}; \quad (20)$$

e.g., I real part column vectors $$\{Re(\underline{X})\}_V(j) = \{Re(x(1,j))Re(x(i,j))Re(x(I,j))\}; \quad (21)$$

e.g., J imaginary part row vectors $$\{Im(\underline{X})\}_V(i) = \{Im(\underline{x}(i,1))Im(\underline{x}(i,n))Im(\underline{x}(i,N))\}; \text{ and} \quad (22)$$

e.g., I imaginary part column vectors $$\{Im(\underline{X})\}_V(j) = \{Im(x(1,j))Im(x(i,j))Im(x(I,j))\}; \quad (23)$$

The multiplication of matrices is introduced with matrices $\{\underline{A}\}$, $\{\underline{B}\}$, and $\{\underline{C}\}$. For example, matrix $\{\underline{A}\}$ has I*N matrix elements $\underline{a}(i,n)$ and matrix $\{\underline{B}\}$ has N*J matrix elements $\underline{b}(n,j)$. By complex matrix multiplication, matrices $\{\underline{A}\}$ and $\{\underline{B}\}$ are multiplied ($\underline{*}$) according to:

$$\{\underline{C}\} = \{\underline{A}\}\underline{*}\{\underline{B}\} \quad (24)$$

or (25)

$$\begin{array}{ccc} \underline{b}(1,1)... & \underline{b}(1,j)... & \underline{b}(1,J) \\ \underline{b}(n,1)... & \underline{b}(n,j)... & \underline{b}(n,J) \\ \underline{b}(N,1)... & \underline{b}(N,j)... & \underline{b}(N,J) \end{array}$$

$$\begin{array}{ccc} \underline{a}(1,1)... & \underline{a}(1,n)... & \underline{a}(1,N) \\ \underline{a}(i,1)... & \underline{a}(i,n)... & \underline{a}(i,N) \\ \underline{a}(I,1)... & \underline{a}(I,n)... & \underline{a}(I,N) \end{array} \quad \begin{array}{ccc} \underline{c}(1,1)... & \underline{c}(1,j)... & \underline{c}(1,J) \\ \underline{c}(i,1)... & \underline{c}(i,j)... & \underline{c}(i,J) \\ \underline{c}(I,1)... & \underline{c}(I,j)... & \underline{c}(I,J) \end{array}$$

Elements $\underline{c}(i,j)$ in matrix $\{\underline{C}\}$ are calculated according to:

$$\underline{c}(i,j) = \sum_{n=1}^{N} \underline{a}(i,n) \underline{*} \underline{b}(n,j) \quad (26)$$

with $\underline{*}$ for complex multiplication as explained in equations (2) to (10). In other words, one element $\underline{c}(i,j)$ of matrix $\{\underline{C}\}$ is the so-called vector product (i,j) of row vector $\{\underline{A}\}_V(i)$ of $\{\underline{A}\}$ and column vector $\{\underline{B}\}_V(j)$:

$$\underline{c}(i,j) = \{\underline{A}\}_V(i)\underline{*}\{\underline{B}\}_V(j) \quad (27)$$

An operation such as in equation (27) is further referred to as vector multiplication.

For complex matrix multiplication, elements $\underline{a}(i,n)$ of $\{\underline{A}\}$ and $\underline{b}(n,j)$ of $\{\underline{B}\}$ are complex and equations (3) and (4) are used in equation (27). Real part $Re(\underline{c}(i,j))$ and imaginary part $Im(\underline{c}(i,j))$ of $\underline{c}(i,j)$ are calculated as:

$$Re(\underline{c}(i,j)) = \sum_{n=1}^{N} [Re(\underline{a}(i,n))*Re(\underline{b}(n,j)) - Im(\underline{a}(i,n))*Im(\underline{b}(n,j))] \quad (28)$$

$$Im(\underline{c}(i,j)) = \sum_{n=1}^{N} [Re(\underline{a}(i,n))*Im(\underline{b}(n,j)) + Im(\underline{a}(i,n))*Re(\underline{b}(n,j))] \quad (29)$$

In equations (28) and (29), the $\Sigma$ symbol could also be placed in front of each *term, and the [ ] could then be left out.

Equations (28) and (29) can be expressed with f(i,j,n)-factors (similar to the f-factors of equations (6), (7), (9), and (10)) and intermediate results ReSum(i,j,n) and ImSum(i,j,n):

$$Re(\underline{c}(i,j)) = \sum_{n=1}^{N} [f_1(i,j,n) + f_2(i,j,n)] = \sum_{n=1}^{N} ReSum(i,j,n) \quad (30)$$

$$Im(\underline{c}(i,j)) = \sum_{n=1}^{N} [f_3(i,j,n) + f_4(i,j,n)] = \sum_{n=1}^{N} ImSum(i,j,n) \quad (31)$$

Using the vector classification of equations (20), (21), (22) and (23), matrix $\{\underline{C}\}$ is calculated as follows: Real part row vectors $\{Re(\underline{C})\}_V(i)$ are calculated when equation (30) is calculated for all j=1 to J. Imaginary part row vectors $\{Im(\underline{X})\}_V(i)$ are calculated when equation (31) is calculated for all j=1 to J.

By real matrix multiplication which is a special case of above mentioned complex matrix multiplication (24), (25), matrices $\{A\}$ and $\{B\}$ are multiplied (*) according to:

$$\{C\} = \{A\}*\{B\} \quad (32)$$

Thereby, elements a(i,n) and b(n,j) are real. Equation (26) for calculating one element c(i,j) is simplified to:

$$c(i, j) = \sum_{n=1}^{N} a(i, n) * b(n, j) \tag{33}$$

Equation (33) represents also scalar multiplication of row vector $\{A\}_r(i)$ and column vector $\{B\}_v(j)$. In other words, one element $c(i,j)$ is the scalar product of row vector $\{A\}_r(i)$ of $\{A\}$ and column vector $\{B\}_v(j)$ of $\{B\}$. A complete matrix $\{C\}$ is calculated as follows: Row vectors $\{C\}_r(j)$ are obtained when equation (33) is calculated for j=1 to J.

DETAILED DESCRIPTION OF A PREFERRED EMBODIMENT

With an apparatus and with methods of the present invention it is possible to alternatively or simultaneously perform real matrix multiplication and complex matrix multiplication. Portions of the apparatus can operate either in a first mode (e.g., real mode) or in a second mode (e.g., complex mode). An advantage of the present invention is, that the elements of one matrix (e.g., of $\{\underline{B}\}$) can stay unchanged in a memory array, while only the elements of the other matrix (e.g., of $\{\underline{A}\}$) are loaded by rows. The present invention takes advantage of logarithmic representations of numbers.

Figure 1:
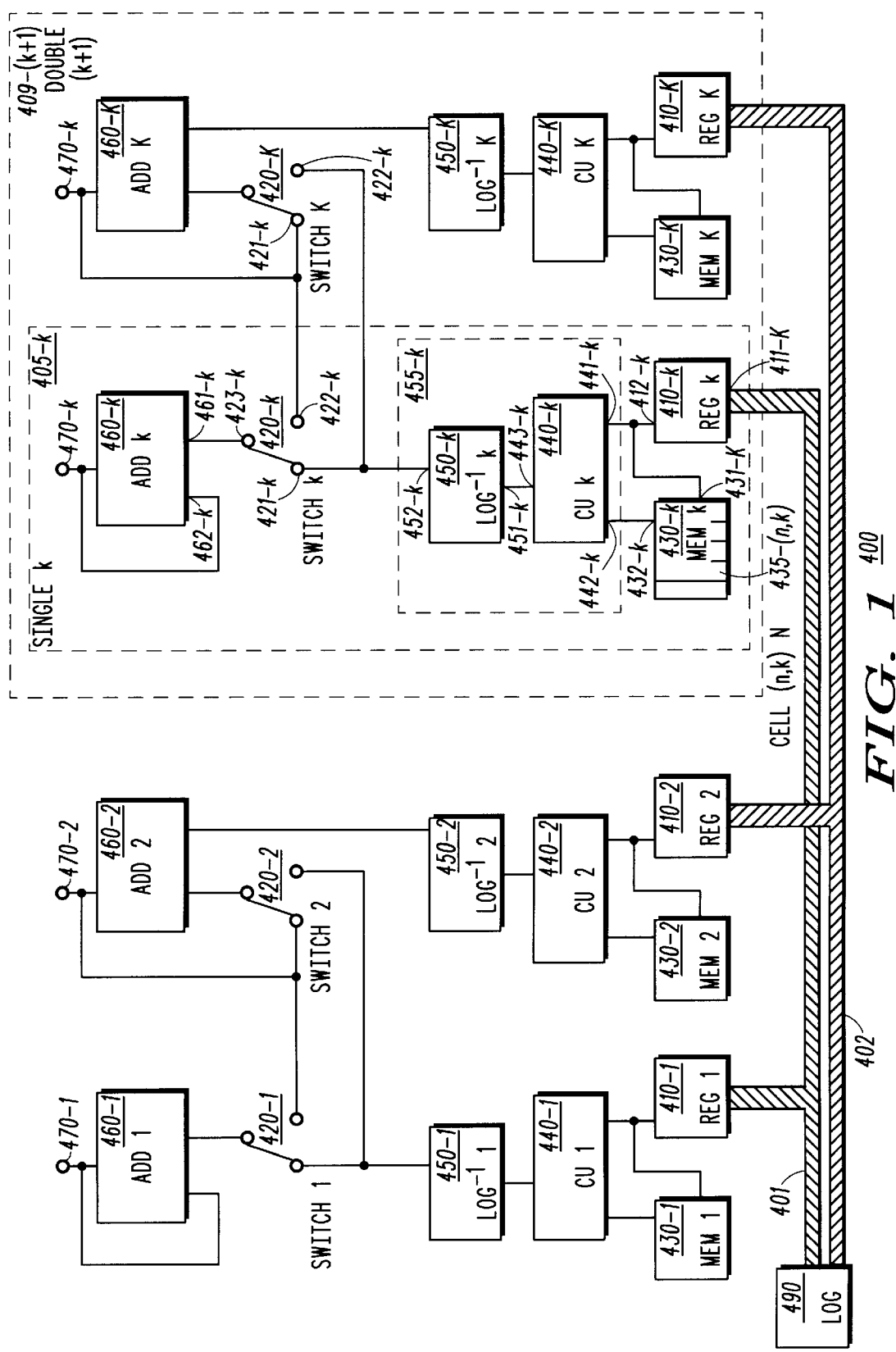
FIG. 1 is a simplified block diagram illustrating a system of the present invention.
Figure 2:
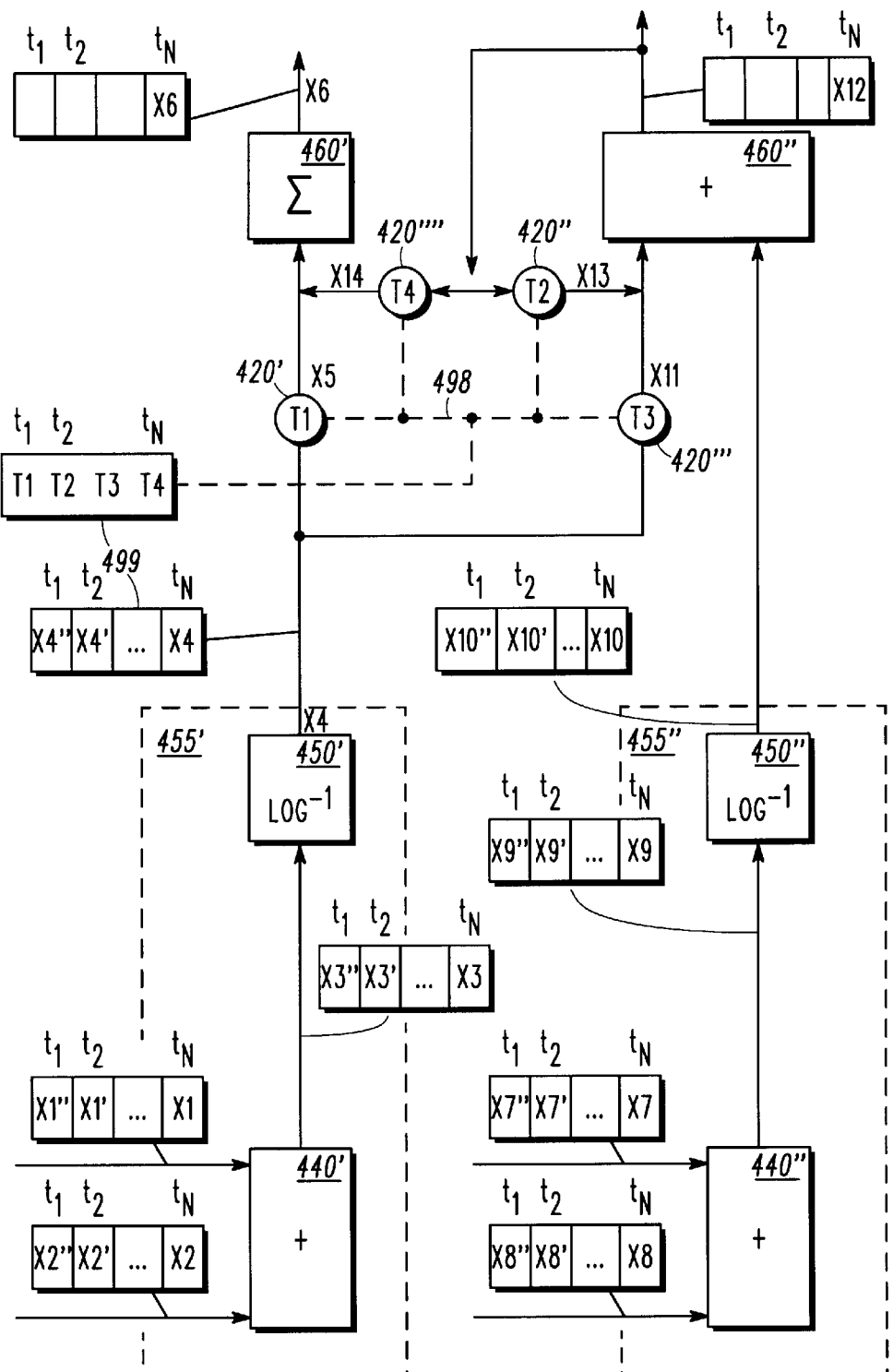
FIG. 2 is a simplified representation of a group as a functional representation of elements of the system of the present invention.
Figure 3:
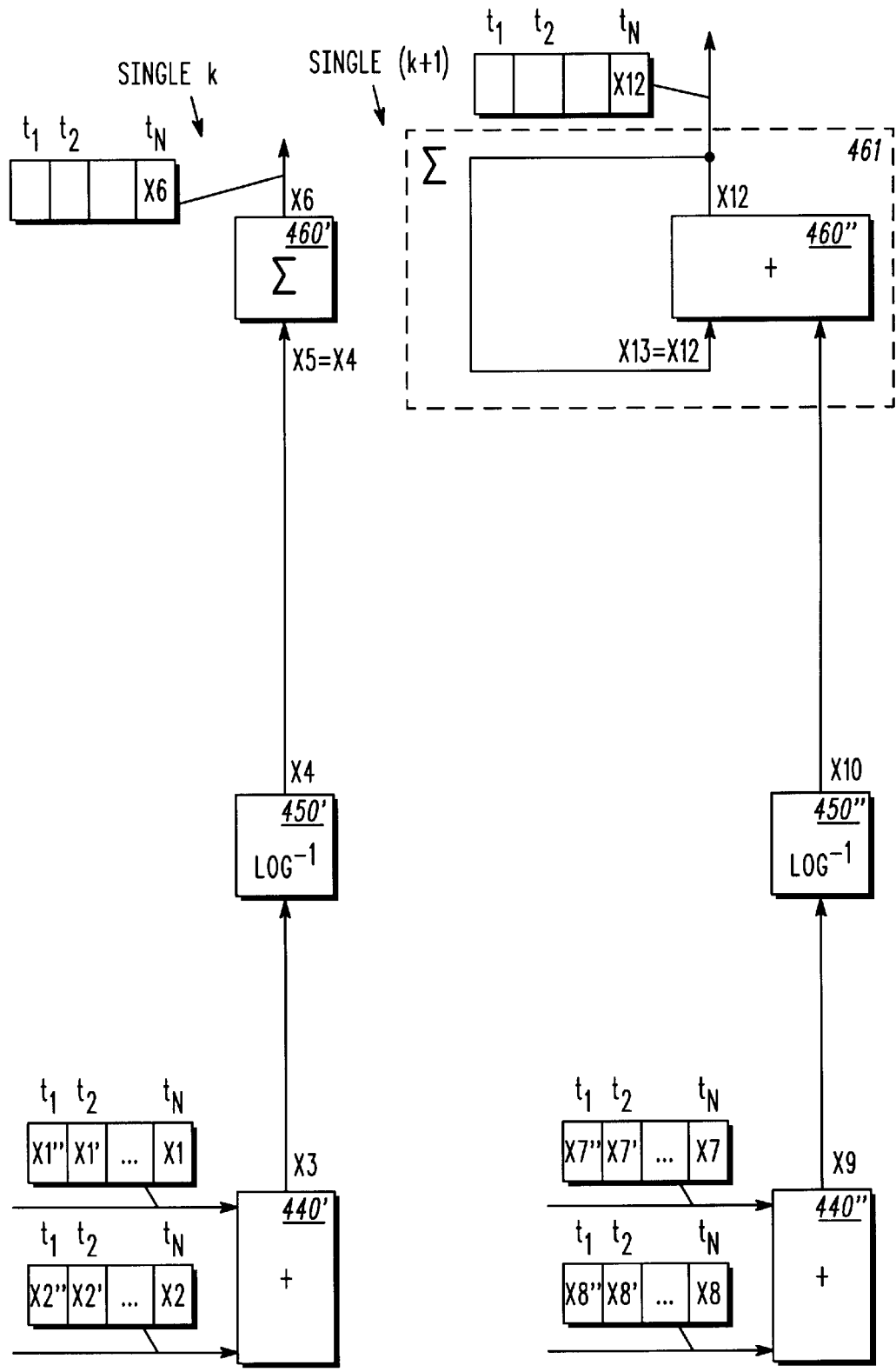
FIG. 3 is a simplified representation of the group of FIG. 2 when the system of FIG. 1 operates in a real mode.
Figure 4:
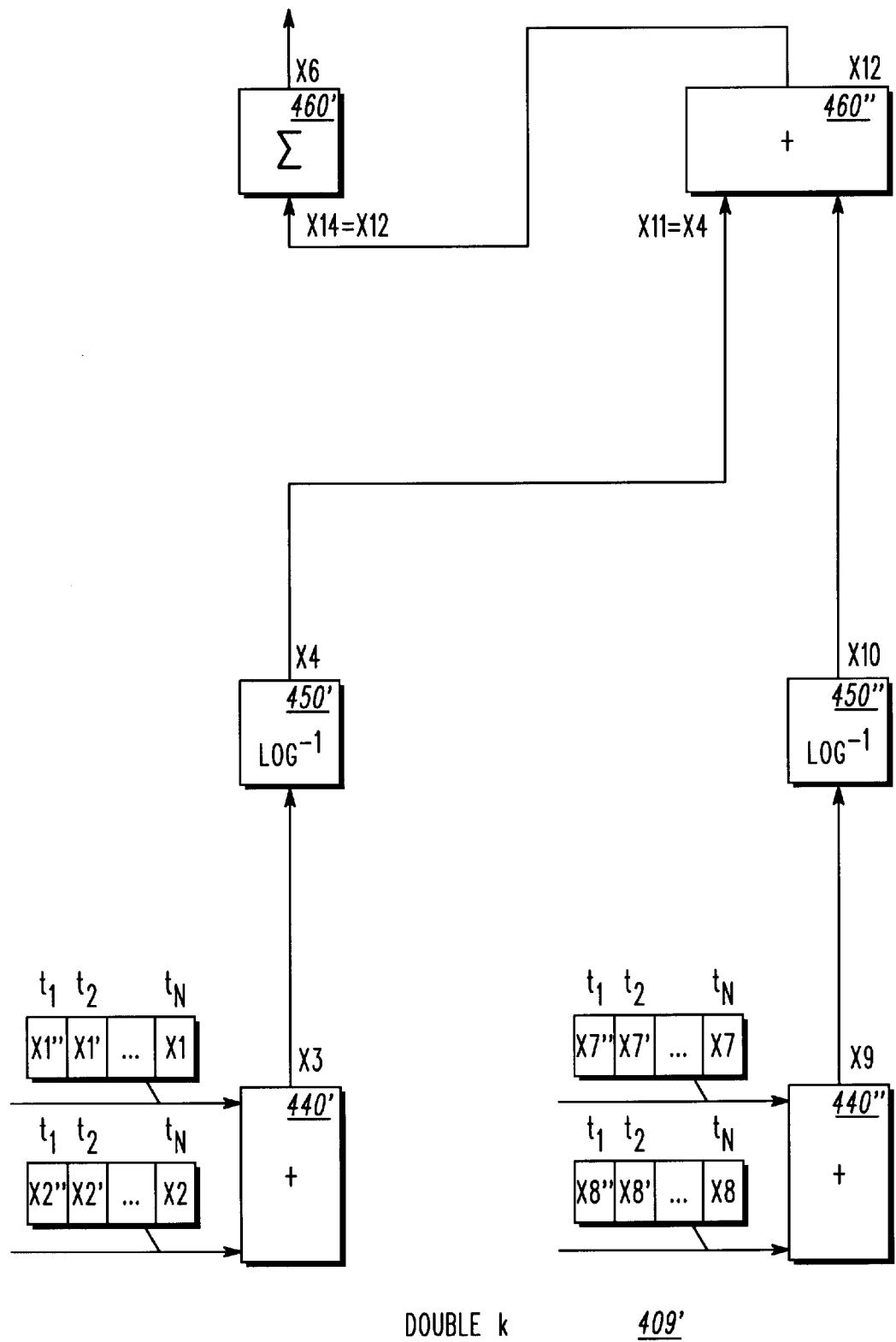
FIG. 4 is a simplified representation of the group of FIG. 2 when the system of FIG. 1 operates in a complex mode.
Figure 5:
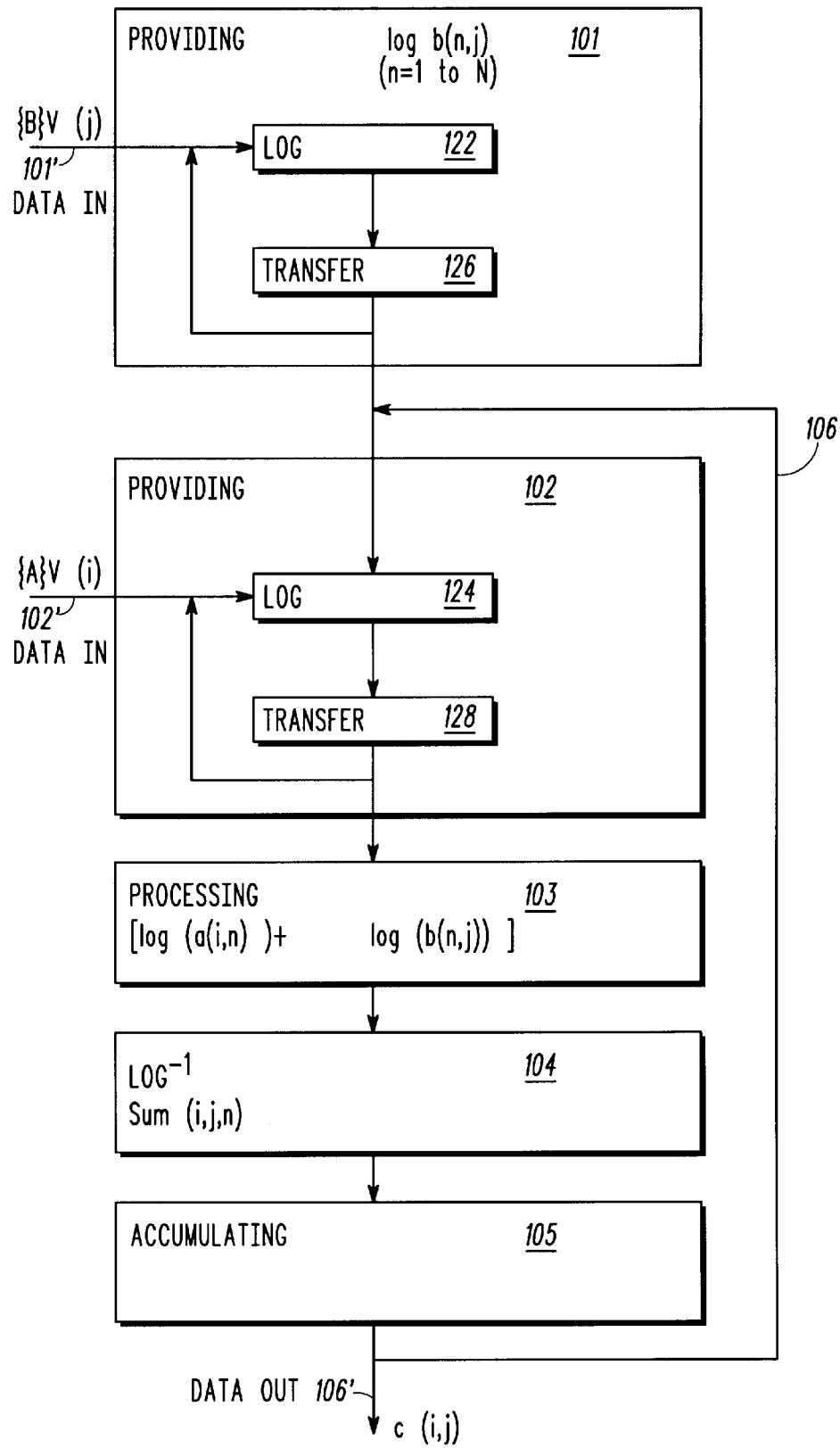
FIG. 5 is a simplified flow chart diagram illustrating a method of the present invention to calculate one real element $c(i,j)$ during a real matrix multiplication $\{C\}=\{A\}*\{B\}$.
Figure 7:
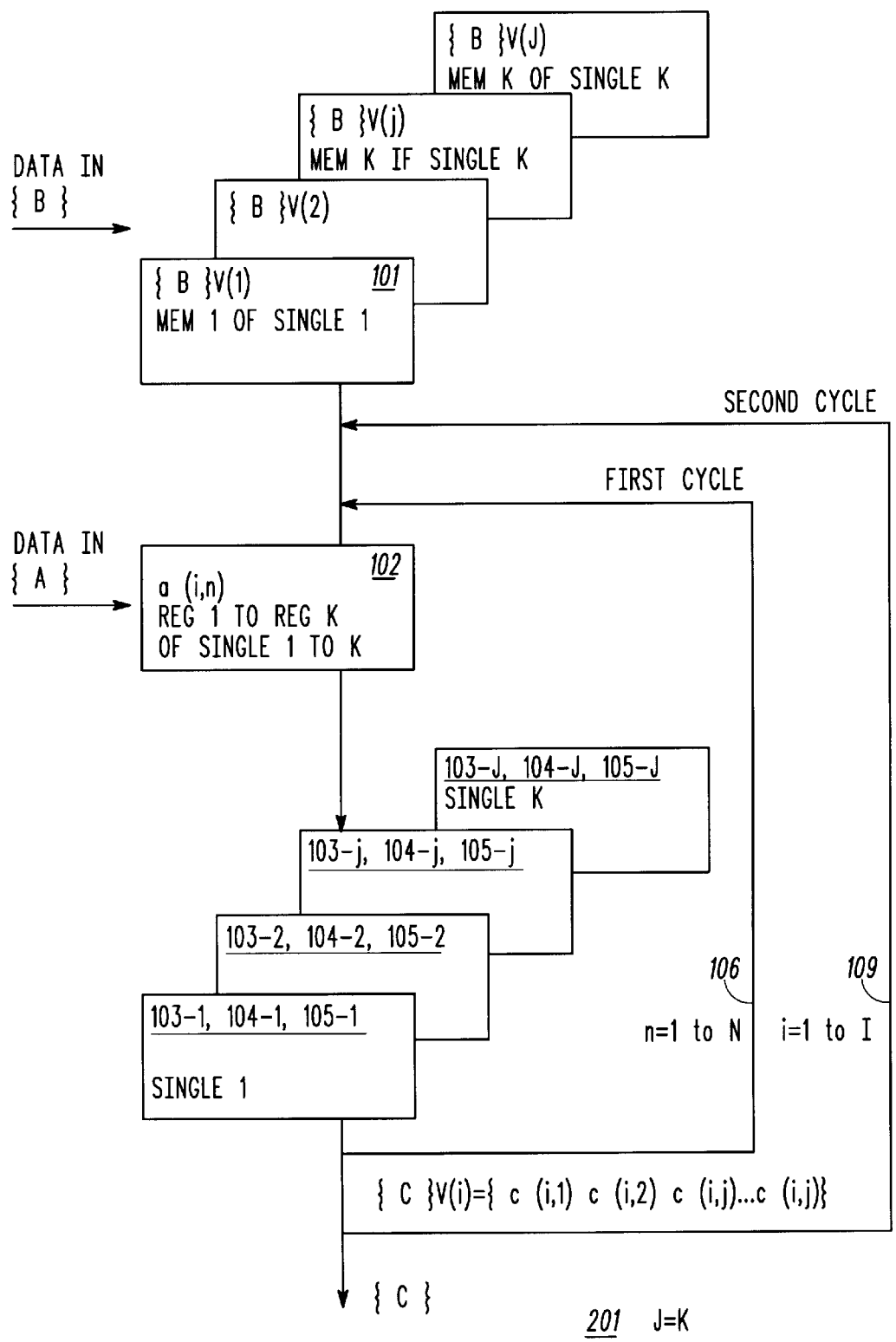
FIG. 7 is a simplified flow chart diagram illustrating a method of the present invention to calculate all elements $c(i,j)$ during a real matrix multiplication $\{C\}=\{A\}*\{B\}$.
Figure 8:
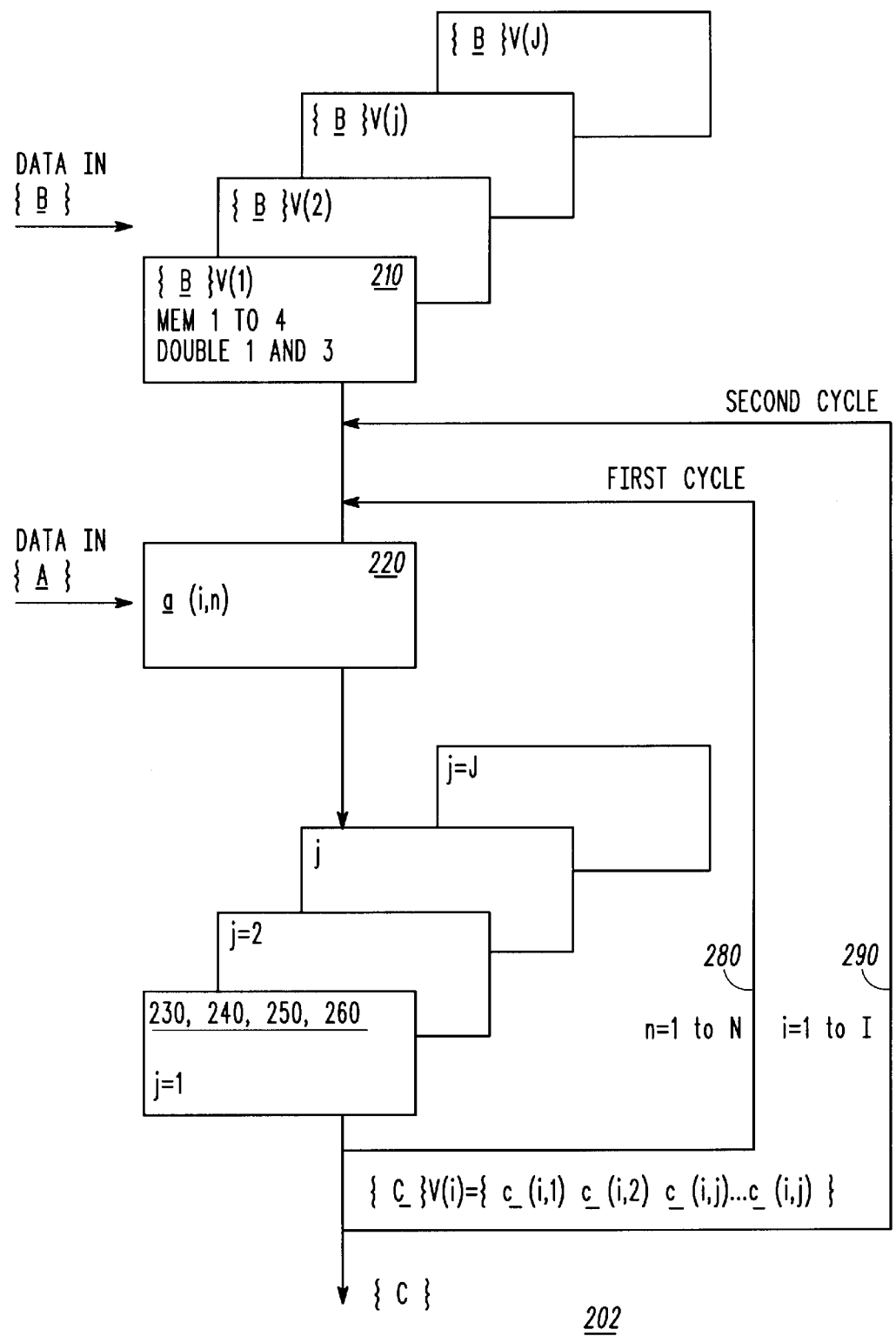
FIG. 8 is a simplified flow chart diagram illustrating a method of the present invention to calculate all elements $\underline{c}(i,j)$ during a complex matrix multiplication $\{\underline{C}\}=\{\underline{A}\}*\{\underline{B}\}$.
Figure 9:
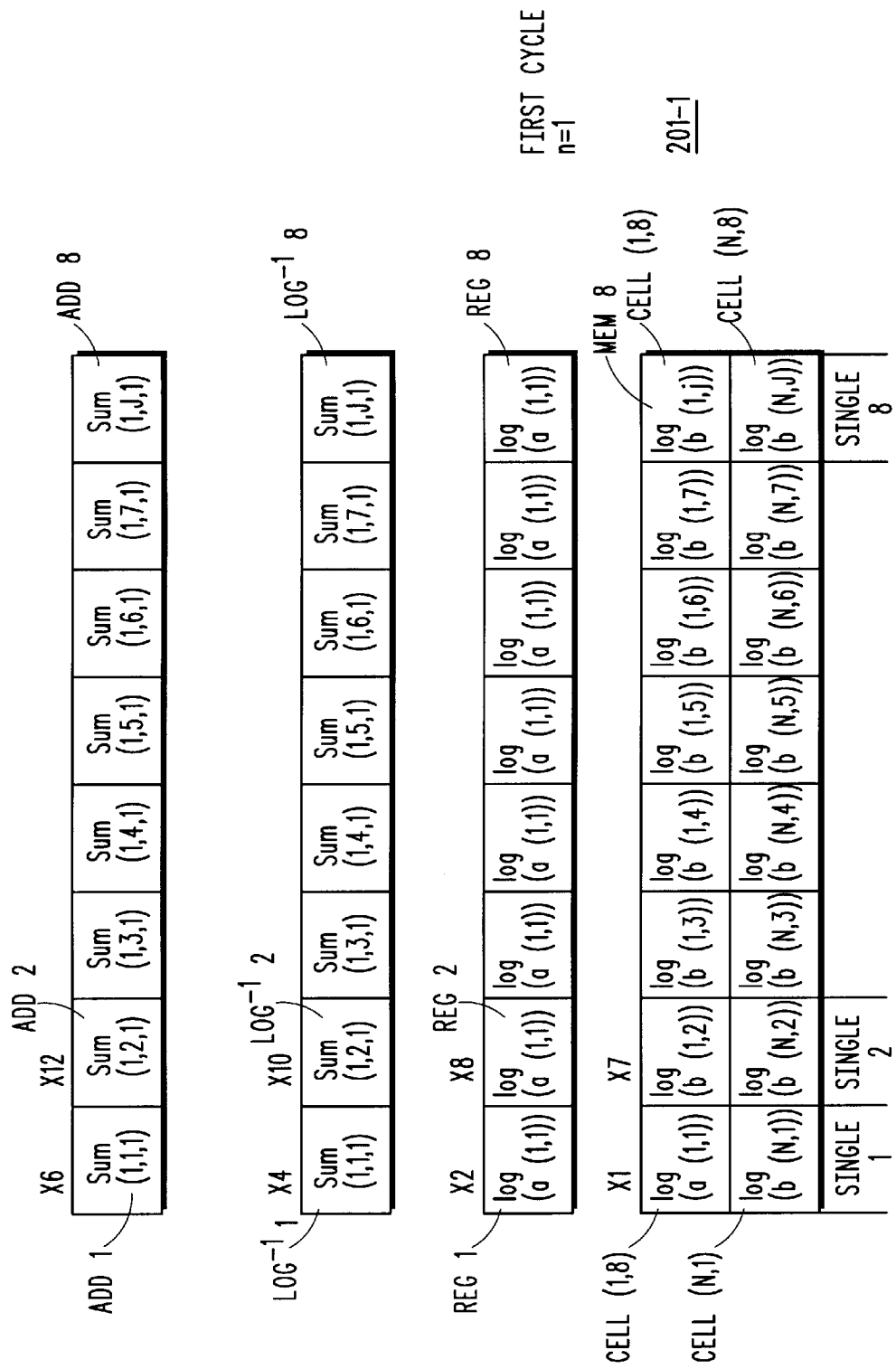
FIGS. 9–10 are time-slices for the system of FIG. 1 illustrating the method of FIG. 7 by a first example.

For convenience, apparatus and methods of the present invention are explained in the following order: (a) in the text, introducing logarithmic representations of the equations of the background section; (b) in the text, introducing a first example of a real matrix multiplication; (c) in the text, introducing a second example of a complex matrix multiplication; (d) by FIG. 1, illustrating system 400 of the present invention; (e) by FIG. 2, illustrating group 409 of system 400; (f) by FIG. 3, illustrating group 409' when system 400 operates in the first mode; (g) by FIG. 4, illustrating group 409'' when system 400 operates in the second mode; (h) by FIG. 5, illustrating method 100 to calculate one real element $c(i,j)$ by vector multiplication in the first example; (i) by FIG. 6, illustrating method 200 to calculate one complex element $\underline{c}(i,j)$ by vector multiplication; (j) by FIG. 7, illustrating method 201 of the present invention to calculate a complete real matrix $\{C\}$; (k) by FIG. 8, illustrating method 202 of the present invention to calculate a complete complex matrix $\{\underline{C}\}$; (l) by FIGS. 8–9, illustrating method 201 in the first example in connection with time slides; and (m) by FIGS. 10–14, illustrating method 202 in the second example in connection with time slices.

(a)

Real numbers y, can be represented in the logarithmic domain by:

$$\log(y) \tag{34}$$

$$y = \log^{-1}(\log(y)) \tag{35}$$

wherein 'log' or the inverse 'log$^{-1}$' symbolize any logarithms (e.g., ln, lb, lg) based on e, 2, 10 or any other convention.

For real matrix multiplication as in equations (32) and (33), it is convenient for purposes of explanation to write equation (33) in logarithmic form. Elements $c(i,j)$ in matrix $\{C\}$ are calculated according to:

$$c(i, j) = \sum_{n=1}^{N} \log^{-1}[\log(a(i, n)) + \log(b(n, j))] \tag{36}$$

or $$c(i, j) = \sum_{n=1}^{N} \text{Sum}(i, j, n) \tag{37}$$

Equation (36) is the logarithmic representation of vector multiplication of a row vector and column vector.

For complex matrix multiplication as in equations (24) to (31) it is also convenient to use logarithmic representations. The f(i,j,n)-factors of equations (28)/(30) and (29)/(31) are written in logarithmic form as $$f_1(i, j, n) = \log^{-1}[\ \log(\text{Re}(\underline{a}(i, n))) \quad +_1 \quad \log(\text{Re}(\underline{b}(n, j)))] \tag{38}$$

$$f_2(i, j, n) = \log^{-1}[\ \log(-\text{Im}(\underline{a}(i, n))) \quad +_2 \quad \log(\text{Im}(\underline{b}(n, j)))] \tag{39}$$

$$f_3(i, j, n) = \log^{-1}[\ \log(\text{Re}(\underline{a}(i, n))) \quad +_3 \quad \log(\text{Im}(\underline{b}(n, j)))] \tag{40}$$

$$f_4(i, j, n) = \log^{-1}[\ \log(\text{Im}(\underline{a}(i, n))) \quad +_4 \quad \log(\text{Re}(\underline{b}(n, j)))] \tag{41}$$

wherein subscripts 1–4 under the + sign * ($+_1$, $+_2$, $+_3$, and $+_4$) are indices for 4 required addition operations.

(b)

In a first example which is not indented to be limiting, real matrix $\{A\}$ having I=2 rows and N=2 columns is multiplied with real matrix $\{B\}$ having N=2 rows and J=8 columns to produce real matrix $\{C\}$ having I=2 rows and J=8 columns. For convenience, matrix $\{A\}$ is introduced with elements $a(i,n)$, $\{B\}$ with $b(n,j)$ and $\{C\}$ with $c(i,j)$.

$$\begin{array}{cccccccc} b(1,1) & b(1,2) & b(1,3) & b(1,4) & b(1,5) & b(1,6) & b(1,7) & b(1,J) \\ b(N,1) & b(N,2) & b(N,3) & b(N,4) & b(N,5) & b(N,6) & b(N,7) & b(N,J) \end{array} \quad (42)$$

$$\begin{array}{cc} a(1,1) \quad a(1,N) \\ a(I,1) \quad a(I,N) \end{array} \quad \begin{array}{cccccccc} c(1,1) & c(1,2) & c(1,3) & c(1,4) & c(1,5) & c(1,6) & c(1,7) & c(1,J) \\ c(I,1) & c(I,2) & c(I,3) & c(I,4) & c(I,5) & c(I,6) & c(I,7) & c(I,J) \end{array}$$

Matrix $\{A\}$ has I=2 row vectors $\{A\}_V(i=1)$ and $\{A\}_V(i=I)$ with each N=2 elements a. Matrix $\{B\}$ has J=8 column vectors $\{B\}_V(j=1)$ to $\{B\}_V(j=J)$ with each N=2 elements b. Matrix elements c(i,j) (for i=1 to I=2, j=1 to J=8, n=1 to N=2) are calculated as follows:

Row vector $\{C\}_v(i = 1)$: (43)

$$\begin{aligned} c(1,1) &= a(1,1)*b(1,1) + a(1,N)*b(N,1) \\ &= \text{Sum}(1,1,1) + \text{Sum}(1,1,N) \\ c(1,2) &= a(1,1)*b(1,2) + a(1,N)*b(N,2) \\ &= \text{Sum}(1,2,1) + \text{Sum}(1,2,N) \\ &\ldots \\ c(1,j) &= a(1,1)*b(1,j) + a(1,N)*b(N,j) \\ &= \text{Sum}(1,j,1) + \text{Sum}(1,j,N) \\ &\ldots \\ c(1,J) &= a(1,1)*b(1,J) + a(1,N)*b(N,J) \\ &= \text{Sum}(1,J,1) + \text{Sum}(1,J,N) \end{aligned}$$

Row vector $\{C\}_v(i = I)$: (44)

$$\begin{aligned} c(I,1) &= a(I,1)*b(1,1) + a(I,N)*b(N,1) \\ &= \text{Sum}(I,1,1) + \text{Sum}(I,1,N) \\ c(I,2) &= a(I,1)*b(1,2) + a(I,N)*b(N,2) \\ &= \text{Sum}(I,2,1) + \text{Sum}(I,2,N) \\ &\ldots \\ c(I,j) &= a(I,1)*b(1,j) + a(I,N)*b(N,j) \\ &= \text{Sum}(I,j,1) + \text{Sum}(I,j,N) \\ &\ldots \\ c(I,J) &= a(I,1)*b(1,J) + a(I,N)*b(N,J) \\ &= \text{Sum}(I,J,1) + \text{Sum}(I,J,N) \end{aligned}$$

(c)

In a second example which is also not intended to be limiting, complex matrix $\{\underline{A}\}$ having I=2 rows and N=2 columns is multiplied with complex matrix $\{\underline{B}\}$ having J=2 columns and N=2 rows to complex matrix $\{\underline{C}\}$ having I=2 rows and J=2 columns. $\{\underline{A}\}$ can be classified into I=1 row vectors $\{\underline{A}\}_V(i)$; $\{\underline{B}\}$ can be classified into J=2 column vectors $\{\underline{B}\}_V(j)$; and $\{\underline{C}\}$ can be classified into row vectors $\{\underline{C}\}_V(i)$. The vectors are further classified (cf. equations 20–23) in real part row vector $\{\text{Re}(\underline{A})\}_V(i)$, real part column vector $\{\text{Re}(\underline{B})\}_V(j)$, in real part row vector $\{\text{Re}(\underline{C})\}_V(i)$, in imaginary part row vector $\{\text{Im}(\underline{A})\}_V(i)$, in imaginary part column vector $\{\text{Im}(\underline{B})\}_V(j)$, and in imaginary part row vector $\{\text{Im}(\underline{C})\}_V(i)$, For convenience, matrices $\{\underline{A}\}$, $\{\underline{B}\}$ and $\{\underline{C}\}$ are introduced with elements $\underline{a}$, $\underline{b}$, and $\underline{c}$ given as pairs [Re, Im]:

$$\begin{array}{cc} \text{Re}(\underline{b}(1,1)) & \text{Re}(\underline{b}(1,J)) \\ \text{Im}(\underline{b}(1,1)) & \text{Im}(\underline{b}(1,J)) \\ \text{Re}(\underline{b}(N,1)) & \text{Re}(\underline{b}(N,J)) \\ \text{Im}(\underline{b}(N,1)) & \text{Im}(\underline{b}(N,J)) \end{array} \quad (45)$$

$$\begin{array}{cccc} \text{Re}(\underline{a}(1,1)) & \text{Re}(\underline{a}(1,N)) & \text{Re}(\underline{c}(1,1)) & \text{Re}(\underline{c}(1,J)) \\ \text{Im}(\underline{a}(1,1)) & \text{Im}(\underline{a}(1,N)) & \text{Im}(\underline{c}(1,1)) & \text{Im}(\underline{c}(1,J)) \\ \text{Re}(\underline{a}(I,1)) & \text{Re}(\underline{a}(I,1)) & \text{Re}(\underline{c}(I,1)) & \text{Re}(\underline{c}(I,J)) \\ \text{Im}(\underline{a}(I,1)) & \text{Im}(\underline{a}(I,N)) & \text{Im}(\underline{c}(I,1)) & \text{Im}(\underline{c}(I,J)) \end{array}$$

Real parts Re and imaginary Im parts of matrix elements $\underline{c}(i,j)$ $\underline{c}(1,1)$, $\underline{c}(1,J)$, $\underline{c}(I,1)$, and $c(I,J)$ for I=J=N=2 are calculated as follows:
In the real part matrix $\{\text{Re}(\underline{C})\}$ with $\{\text{Re}(\underline{C})\}_V(i=1)$ and $\{\text{Re}(\underline{C})\}_V(i=2)$ Real part row vector $\{\text{Re}(\underline{C})\}_V(i=1)$ with $\text{Re}(\underline{c}(1,1))$ and $\text{Re}(\underline{c}(1,J))$ (for $i = 1$ and $j = 1$) (46)

$$\begin{aligned} \text{Re}(\underline{c}(1,1)) &= [\text{Re}(\underline{a}(1,1))*\text{Re}(\underline{b}(1,1)) - \text{Im}(\underline{a}(1,1))*\text{Im}(\underline{b}(1,1))] \\ &\quad + \\ &\quad [\text{Re}(\underline{a}(1,N))*\text{Re}(\underline{b}(N,1)) - \text{Im}(\underline{a}(1,N))*\text{Im}(\underline{b}(N,1))] \\ &= [f_1(1,1,1) + f_2(1,1,1)] \\ &\quad + \\ &\quad [f_1(1,1,N) + f_2(1,1,N)] \\ &= \text{ReSum}(1,1,1) \\ &\quad + \\ &\quad \text{ReSum}(1,1,N) \end{aligned}$$

-continued (for $i = 1$ and $j = J$)    (47)

$$\begin{aligned}
\text{Re}(\underline{c}(1, J)) &= [\text{Re}(\underline{a}(1, 1)) * \text{Re}(\underline{b}(1, J)) - \text{Im}(\underline{a}(1, 1)) * \text{Im}(\underline{b}(1, J))] \\
&\quad + \\
&\quad [\text{Re}(\underline{a}(1, N)) * \text{Re}(\underline{b}(N, J)) - \text{Im}(\underline{a}(1, N)) * \text{Im}(\underline{b}(N, J))] \\
&= [f_1(1, J, 1) \quad + f_2(1, J, 1)] \\
&\quad + \\
&\quad [f_1(1, J, N) \quad + f_2(1, J, N)] \\
&= \text{ImSum}(1, J, 1) \\
&\quad + \\
&\quad \text{ImSum}(1, J, N)
\end{aligned}$$

Real part row vector $\{\text{Re}(\underline{C})\}_v (i = I)$ with $\text{Re}(\underline{c}(I, I))$ and $\text{Re}(\underline{c}(I, J))$    (48)

for $i = I$ and $j = 1$:

$$\begin{aligned}
\text{Re}(\underline{c}(I, 1)) &= [\text{Re}(\underline{a}(I, 1)) * \text{Re}(\underline{b}(1, 1)) - \text{Im}(\underline{a}(I, 1)) * \text{Im}(\underline{b}(1, 1))] \\
&\quad + \\
&\quad [\text{Re}(\underline{a}(I, N)) * \text{Re}(\underline{b}(N, 1)) - \text{Im}(\underline{a}(I, N)) * \text{Im}(\underline{b}(N, 1))] \\
&= [f_1(I, 1, 1) \quad + f_2(I, 1, 1)] \\
&\quad + \\
&\quad [f_1(I, 1, N) \quad + f_2(I, 1, N)] \\
&= \text{ReSum}(I, 1, 1) \\
&\quad + \\
&\quad \text{ReSum}(I, 1, N)
\end{aligned}$$

for $i = I$ and $j = J$:    (49)

$$\begin{aligned}
\text{Re}(\underline{c}(I, J)) &= [\text{Re}(\underline{a}(I, 1)) * \text{Re}(\underline{b}(1, J)) - \text{Im}(\underline{a}(I, 1)) * \text{Im}(\underline{b}(1, J))] \\
&\quad + \\
&\quad [\text{Re}(\underline{a}(I, N)) * \text{Re}(\underline{b}(N, J)) - \text{Im}(\underline{a}(I, N)) * \text{Im}(\underline{b}(N, J))] \\
&= [f_1(I, J, 1) \quad + f_2(I, J, 1)] \\
&\quad + \\
&\quad [f_1(I, J, N) \quad + f_2(I, J, N)] \\
&= \text{ReSum}(I, J, 1) \\
&\quad + \\
&\quad \text{ReSum}(I, J, N)
\end{aligned}$$

In the imaginary part matrix $\{\text{Im}(\underline{C})\}$ with $\{\text{Im}(\underline{C})\}_v(i=1)$ and $\{\text{Im}(\underline{C})\}_v(i=2)$    (50)
Imaginary part row vector $\{\text{Im}(\underline{C})\}_v(i=1)$ with $\text{Im}(\underline{c}(1, 1))$ and $\text{Im}(\underline{c}(1, J))$
(for $i = 1$ and $j = 1$)

$$\begin{aligned}
\text{Im}(\underline{c}(1, 1)) &= [\text{Re}(\underline{a}(1, 1)) * \text{Im}(\underline{b}(1, 1)) + \text{Im}(\underline{a}(1, 1)) * \text{Re}(\underline{b}(1, 1))] \\
&\quad + \\
&\quad [\text{Re}(\underline{a}(1, N)) * \text{Im}(\underline{b}(N, 1)) + \text{Im}(\underline{a}(1, N)) * \text{Re}(\underline{b}(N, 1))] \\
&= [f_3(1, 1, 1) \quad + f_4(1, 1, 1)] \\
&\quad + \\
&\quad [f_3(1, 1, N) \quad + f_4(1, 1, N)] \\
&= \text{ImSum}(1, 1, 1) \\
&\quad + \\
&\quad \text{ImSum}(1, 1, N)
\end{aligned}$$

-continued (for $i = 1$ and $j = J$): (51)

$$\begin{aligned}\operatorname{Im}(\underline{c}(1, J)) &= [\operatorname{Re}(\underline{a}(1, 1)) * \operatorname{Im}(\underline{b}(1, J)) + \operatorname{Im}(\underline{a}(1, 1)) * \operatorname{Re}(\underline{b}(1, J))] \\ &+ \\ &\phantom{=} [\operatorname{Re}(\underline{a}(1, N)) * \operatorname{Im}(\underline{b}(N, J)) + \operatorname{Im}(\underline{a}(1, N)) * \operatorname{Re}(\underline{b}(N, J))] \\ &= [f_3(1, J, 1) \phantom{xxx} + f_4(1, J, 1)] \\ &+ \\ &\phantom{=} [f_3(1, J, N) \phantom{xxx} + f_4(1, J, N)] \\ &= \operatorname{ImSum}(1, J, 1) \\ &+ \\ &\phantom{=} \operatorname{ImSum}(1, J, N)\end{aligned}$$

Imaginary part row vector $\{\operatorname{Im}(\underline{C})\}_v (i = I)$ with $\operatorname{Im}(\underline{c}(I, 1))$ and $\operatorname{Im}(\underline{c}(I, J))$ (52)

(for $i = I$ and $j = 1$):

$$\begin{aligned}\operatorname{Im}(\underline{c}(I, 1)) &= [\operatorname{Re}(\underline{a}(I, 1)) * \operatorname{Im}(\underline{b}(1, 1)) + \operatorname{Im}(\underline{a}(I, 1)) * \operatorname{Re}(\underline{b}(1, 1))] \\ &+ \\ &\phantom{=} [\operatorname{Re}(\underline{a}(I, N)) * \operatorname{Im}(\underline{b}(N, 1)) + \operatorname{Im}(\underline{a}(I, N)) * \operatorname{Re}(\underline{b}(N, 1))] \\ &= [f_3(I, 1, 1) \phantom{xxx} + f_4(I, 1, 1)] \\ &+ \\ &\phantom{=} [f_3(I, 1, N) \phantom{xxx} + f_4(I, 1, N)] \\ &= \operatorname{ImSum}(I, 1, 1) \\ &+ \\ &\phantom{=} \operatorname{ImSum}(I, 1, N)\end{aligned}$$

(for $i = I$ and $j = J$) (53)

$$\begin{aligned}\operatorname{Im}(\underline{c}(I, J)) &= [\operatorname{Re}(\underline{a}(I, 1)) * \operatorname{Im}(\underline{b}(1, J)) + \operatorname{Im}(\underline{a}(I, 1)) * \operatorname{Re}(\underline{b}(1, J))] \\ &+ \\ &\phantom{=} [\operatorname{Re}(\underline{a}(I, N)) * \operatorname{Im}(\underline{b}(N, J)) + \operatorname{Im}(\underline{a}(I, N)) * \operatorname{Re}(\underline{b}(N, J))] \\ &= [f_3(I, J, 1) \phantom{xxx} + f_4(I, J, 1)] \\ &+ \\ &\phantom{=} [f_3(I, J, N) \phantom{xxx} + f_4(I, J, N)] \\ &= \operatorname{ImSum}(I, J, 1) \\ &+ \\ &\phantom{=} \operatorname{ImSum}(I, J, N)\end{aligned}$$

(d)

FIG. 1 is a simplified block diagram illustrating system 400 of the present invention. In pluralities of k=1 to K, system 400 comprises registers 410-k (hereinafter REG k), memory 430-k hereinafter MEM k), computational units 440-k (hereinafter CU k), optional inverse log unit 450-k (hereinafter LOG$^{-1}$ k), switches 420-k (hereinafter SWITCH k), and adding units 460-k (hereinafter ADD k). Optionally, system 400 comprises log unit 490 (hereinafter LOG). For every k=1 to k=K, REG k, MEM k, CU k, LOG$^{-1}$ k, SWITCH k, and ADD k form single computational element 405-k (hereinafter SINGLE k). For example, SINGLE k is enclosed by dashed frame 405-k. Two computational elements SINGLE k and SINGLE (k+1) (preferably with odd k) form a group called DOUBLE k (dashed frame 409). DOUBLE has conveniently an odd reference number.

Preferably, the total number K of computational elements SINGLE k is even and K=64 is convenient, but other values can also be used. For simplicity, FIG. 1 shows K=4. For further explanation in reference to a first example in FIGS. 7–8 and to a second example in FIGS. 9–12, K is assumed to be K=8.

In a preferred embodiment, each SINGLE k comprises register 410-k (REG k), memory 430-k (MEM k), computational unit 440-k (CU k), inverse log unit 450-k (LOG$^{-1}$ k), switch 420-k (SWITCH k), and adder 460-k (ADD k). Each SINGLE k receives an input in log representation from log unit 490 and provides output 470-k.

For purposes of explanation, it is convenient to classify SINGLE k and its elements REG k, MEM k, CU k, LOG$^{-1}$ k, SWITCH k, and ADD k into a first set and a second set. The first set comprises these elements identified by odd value of k (e.g., k=1, 2, 3) and the second set comprises these elements identified by even value of k (e.g., k=2, 4, 6). The first set (e.g., odd k) and the second set (e.g., even k) have, preferably, an equal magnitude of K/2. The term "adjacent" as used herein, represents two elements having indices k and (k+1) or having indices k and (k−1). For example, REG 1 is adjacent to REG 2; and REG 2 is adjacent to REG 3, . . . REG 64 is adjacent to REG 63, etc. For convenience, the terms "odd" and "even" are also used as modifiers when referring to a SINGLE k or internal element thereof.

According to the invention, in a first mode ("real mode"), system 400 calculates real matrices $\{C\}=\{A\}*\{B\}$ (equation 32); and alternatively in a second mode ("complex mode"), system 400 calculates complex matrices $\{\underline{C}\}=\{\underline{A}\}*\{\underline{B}\}$ (equation 24).

Preferably, system 400 receives input data (e.g., elements $\underline{a}$ of $\{\underline{A}\}$ and elements $\underline{b}$ of $\{\underline{B}\}$) via log unit 490 which provides logarithmic representations of the elements on busses 401 and 402. System 400 provides output data, preferably in non-logarithmic form (e.g., elements c of {C}) at outputs 470-k of ADD k (k=1 to K).

As a person of skill in the art will understand, based on the description which follows, a first portions of system 400 can operate in the first mode, and a second portion can operate in the second mode. SWITCH k is preferably a 3-pole toggle switch with main terminals 423-k and auxiliary terminals 421-k, and 422-k. In real mode, terminal 423-k is coupled to terminal 421-k and not coupled to terminal 422-k (e.g., first position "1"). FIG. 1 illustrates SWITCH k in position "1". In complex mode, terminal 423-k is coupled to terminal 422-k and not coupled to terminal 421-k (e.g., second position "2"). A person of skill in the art is able, based on the description herein, to control SWITCH k by, e.g. logic signals or other means which are for the purpose of simplicity not shown in FIG. 1. Also, the switches and the connections between them can be modified without departing from the scope of the invention.

LOG and $LOG^{-1}$ k conveniently comprises the log/inverse-log converters disclosed in the above-identified related invention [2] (Ser. No. 08/381,368). However, it will be realized by one skilled in the art that any other log/inverse-log converter, including those disclosed in above-identified related inventions [3]–[6] (Ser. Nos. 08/382,467, 08/391,880, 08/381,167, and 08/508,365) could instead be incorporated in LOG and $LOG^{-1}$ k without affecting the scope of the present invention. The use of LOG and $LOG^{-1}$ is optional for the present invention. CU k, MEM k, and REG k are, preferably, based on the architecture disclosed in above identified related invention [7] (Ser. No. 08/401,515). The architecture of system 400 is also described in [1].

Each MEM k comprises N memory cells 435-(n,k) (hereinafter CELL (n,k)) and can store, preferably, N (conveniently N=128) real numbers. The pluralities of MEM k (k=1 to K) can be considered as a memory array having K columns and N rows. The pluralities of REG 1 to REG k are called "register array". CELL (n,k) of MEM k and REG k are collectively referred to as memory locations. Each SINGLE k, has, preferably, (N+1) memory locations, or in other words, each DOUBLE k has 2*(N+1)=(2*N)+2 memory locations.

Bus 401 is coupled to inputs 411-k of, preferably, odd numbered REG k, such as e.g., to REG 1; and bus 402 is coupled to inputs 411-k of, preferably, even numbered REG k, such as, e.g., to REG 2 and REG K. Output 412-k of REG k is coupled to input 441-k of CU k and to input 431-k of MEM k. Output 432 of MEM k is coupled to input 442-k of CU k. Output 443-k of CU k is coupled to input 451-k of $LOG^{-1}$ k. Output 452-k of odd numbered $LOG^{-1}$ k is coupled to terminal 421-k of odd SWITCH k and terminal 422-(k+1) of SWITCH (k+1). Terminal 422-k of odd numbered SWITCH k is coupled to terminal 421-(k+1) of neighboring even numbered SWITCH 420-(k+1). Terminal 423-k of switch 420-k is coupled to input 461-k of ADD k. Odd ADD k has output 470-k coupled to its input 462-k. In difference, even ADD k has output 470-k coupled to its input 462-k via SWITCH k. Terminal 423-k of even SWITCH k is coupled to input 462-k of even ADD k. Odd ADD k, which have one of their inputs (e.g., input 462-k) permanently coupled to its output 470-k, operate as accumulators. Even ADD k, which have one of their inputs (e.g., input 462-k) selectively coupled to its outputs 470-k or to adjacent, odd $LOG^{-1}$ (k−1), operate as accumulators (SWITCH k at "1" in real mode) or as adder (SWITCH k at "2" in complex mode).

The designation of the terms "adding unit" (ADD), "accumulator", and "adder" was chosen for convenience.

The terms "adder" (symbol +) "accumulator" (symbol Σ) stand for the function and the term "adding unit" refers to a hardware implementation. In connection with a description of the present invention, an "adder" has two inputs (e.g., inputs 461-k and 462-k of ADD k) receiving real numbers x and y and has one output (e.g., output 470-k of ADD k) providing a real number z with substantially no delay:

$$z=x+y \tag{54}$$

CU k can also operates as an adder with e.g., inputs 441-k for x, 442-k for y and output 443-k for z.

An accumulator has one input (e.g., input 461-k of ADD k) receiving different real numbers $x_n$ in repetitions n=1, 2, n' to N and has one output (e.g., output 470-k of ADD k) providing a real number which has in repetition n' the value of:

$$z_n = \left(\sum_{n=1}^{n'} x_n\right) + R \tag{55}$$

Variable R symbolizes a value which is available at the accumulator output (e.g., output 470-k) before the repetitions start and is assumed for convenience to be R=0. A person of skill in the art is able to reset an accumulator to e.g., R=0 without the need for more explanation.

For simplicity of further explanation, it is convenient to assume that the elements of system 400, such as, for example, CU k, $LOG^{-1}$ k, and ADD k, operate with substantially no delay.

For convenience, CU k and $LOG^{-1}$ k are collectively referred to as multiplication unit 455-k (dashed frame). In multiplication unit, CU k operates as an adder.

System 400 can be described as follows for both modes: In the first mode (real), system 400 comprises K similar SINGLE k (k=1 to K) wherein in each SINGLE k, MEM k and REG k are coupled to CU k, CU k is coupled to $LOG^{-1}$ k, and $LOG^{-1}$ is coupled to accumulator k.

In the second mode (complex), system 400 comprises K/2 similar DOUBLE k, wherein each DOUBLE k has odd SINGLE k and even SINGLE (k+1). In both SINGLE k and (k+1), MEM k and REG k are coupled to CU k, CU k is coupled to $LOG^{-1}$ k. $LOG^{-1}$ k of SINGLE k is coupled to adder (k+1) of neighboring SINGLE (k+1), but not coupled to ADD k of its own SINGLE k. $LOG^{-1}$ (k+1) of SINGLE (k+1) is coupled to adder (k+1). Adder (k+1) is coupled to accumulator k of SINGLE k. It is not important for the invention, which ADD (ADD k or ADD (k+1)) is used as accumulator and as an adder and vice versa. It is only important that in the first mode both ADD k and ADD (k+1) of one DOUBLE k are used independently as accumulators and that in this second mode, $LOG^{-1}$ k and $LOG^{-1}$ (k+1) are coupled by either ADD k or ADD (k+1) operating as adder and that the other ADD (k+1) (or ADD k) operates as an accumulator.

(e)

FIG. 2 is a simplified representation of group 409 ("DOUBLE k") showing a functional representation of the elements of system 400 of the present invention. FIG. 2 is convenient for explaining how system 400 operates in the first (real) mode and in the second (complex) mode. System 400 (FIG. 1) comprises a plurality of (K/2) groups 409 ("DOUBLE k") shown in FIG. 2. To illustrate timing of system 400, time boxes 499 pointing to signals lines have consecutive illustrative signals within time slots $t_1$, $t_2$, $t_n$, and so forth to $t_N$. Time slots $t_1$ to $t_N$ form a cycle. As illustrated in FIG. 2, each of DOUBLE k receives variables X1, X2, X7 and X8. Signals X1, X2, X7 and X8 can change with every time slot $t_n$. DOUBLE k receives logic signals T1, T2, T3, and T4 having logical states "1" or "0" and being, preferably, constant through $t_1$ to $t_N$. Logic signals T1, T2, T3, and T4 are distributed by a control network 498 (dashed lines). DOUBLE k provides variables X6 and X12 at $t_N$. DOUBLE employs intermediate variables X3, X4, X5, X9, X10, X11, X13, and X14. Variables X1 to X14 have real values (such as e.g., a(i,n), b(n,j) c(i,j), Re, Im). Some of them, for example, variables X5, X11, X13 and X14 also have a state Ø, where the symbol Ø includes a "tristate". Addition (+) is defined as:

$$X5+\emptyset = X5, \tag{56}$$

$$X11+\emptyset = X11,$$

$$X13+\emptyset = X13 \text{ and}$$

$$X14+\emptyset = X14,$$

DOUBLE has adder 440' (+ symbol) receiving X1 and X2 and providing X3=X1+X2, adder 440" (+ symbol) receiving X7 and X8 and providing X9=X7+X8, $\log^{-1}$ unit 450' providing X4=$\log^{-1}$ (X3), $\log^{-1}$ unit 450" providing X10=$\log^{-1}$ (X9), gate 420' (circle symbol) receiving X1 and T1 and providing X5=X4 for T1="1" or X5=Ø for T1="0", gate 420" receiving X12 and T2 and providing X13=X12 for T2="1" or X13=Ø for T2="0", gate 420''' receiving X4 and T3 and providing X11=X4 for T3="1" or X11=Ø for T3="0"; gate 420'''' receiving X12 and T4 and providing X14=X12 for T4="1" or X14=Ø for T4="0", accumulator 460' (Σ symbol) receiving (X5+X14) and providing X6=Σ (X5+X14) at the end of the first cycle, and adder 460" (+ symbol) receiving (X13+X11) and X10 and providing X12= (X13+X11)+X10. Adder 440' and $\log^{-1}$ unit 450' form multiplication unit 455' and adder 440" and $\log^{-1}$ unit 450" form multiplication unit 455" (dashed frames).

(f)

FIG. 3 is a simplified representation of group 409 of FIG. 2 (here 409', DOUBLE k) when system 400 of FIG. 1 operates in the real mode. For convenience, components on the left side (440', 250', 460') are labeled SINGLE k and components on the right side (440", 450", 460", 461) are labeled SINGLE (k+1). Preferably, logic signals T1 to T4 are T1=T2="1" and T3=T4="0". Lines with Ø-signals are not shown for simplicity. Adder 460" and its output line (X12=X13) going to an input operates as accumulator 461 (Σ symbol in dashed frame).

X6 and X12 are calculated during one cycle ($t_1$, $t_n$ to $t_N$) according to:

$$X6 = \sum_{n=1}^{N} \log^{-1}(X1_n + X2_n) \tag{57}$$

$$X12 = \sum_{n=1}^{N} \log^{-1}(X7_n + X8_n). \tag{58}$$

(g)

FIG. 4 is a simplified representation of group 409 of FIG. 2 (here 409", DOUBLE k) when system 400 of FIG. 1 operates in the complex mode. Preferably, logic signals T1 to T4 are T1=T2="0" and T3=T4="1". Lines with Ø-signals are not shown for simplicity. Signal X12 is an intermediate signal and X6 is calculated during one cycle ($t_0$, $t_1$, to $t_N$) according to:

$$X12 = \sum_{n=1}^{N} \{\log^{-1}(X1_n + X2_n) + \log^{-1}(X7_n + X8_n) \tag{59}$$

Equation (59) has the same form as equation (30) and (31).

(h)

FIG. 5 is a simplified flow chart diagram illustrating method 100 to calculate an element c(i,j) (equation 15) during a real matrix multiplication {C}={A}*{B} (equation 14). Method 100 uses one SINGLE k (REG k, MEM k, CU k, LOG$^{-1}$ k, SWITCH k, ADD k) as well as LOG and busses 401 and 402 of system 400. System 400 operates in a first mode with SWITCH k at position "1".

According to method 100, LOG, REG k, MEM k, CU k, and ACCU k of system 400 calculate one real element c(i,j) of {C} from elements a(i,n) and b(n,j) of real matrices {A} and {B}, respectively. Row vector {A}$_r$(i) (equation 16) on "DATA IN" line 101' is multiplied (vector multiplication, equation 27) with column vector {B}$_r$(j) (equation 17) to element c(i,j) (vector product) on "DATA OUT" line 106'.

It is assumed that an initial value at output 470-k of ADD k is zero (cf. R in equation 55). This can be performed by person of skill in the art without the need of further explanations. Method 100 has, preferably, the following steps:

In first providing step 101, system 400 stores logarithmic representations log(b(n,j)) of {B} for n=1 to N in MEM k. Preferably, providing step 101 comprises log step 122 and transferring step 126 which are cyclically repeated (line 170) for n=1 to n=N. In log step 122, LOG receives b(n,j) and sends log( b(n,j)) to bus 401 or 402. In transferring step 126, REG k sends log(b(n,j)) to a field of MEM k via output 412-k of REG k and input 431-k of MEM k.

In second providing step 102, system 400 stores logarithmic representations log(a(i,n)) of one element of {A} in REG k. Thereby, system 400 begins, preferably with log(a(i,n)) for n=1. Preferably, step 102 comprises log step 124 and transferring step 128 which are, preferably, performed once within providing step 102. In log step 122, LOG receives a(i,n) and sends log(a(i,n)) to bus 401. In transferring step 128, REG k receives log(a(i,n)) at input 410-k.

In processing step 103, CU k receives log(a(i,n)) at input 441-k from output 412-k of REG k and receives log(b(n,j)) from MEM k at output 432-k and provides an intermediate result [log(a(i,n))+log(b(n,j))] (equation 36) at output 443-k of CU k.

In log$^{-1}$-step 104, LOG-1 k receives the intermediate result [log(a(i,n))+log(b(n,j))] at input 451-k and provides Sum(i,j,n)=log$^{-1}$ [log(a(i,n))+log(b(n,j))] by inverse logarithmic operation at output 452-k of LOG$^{-1}$ k (equation 37).

In accumulating step 105, ADD k receives Sum(i,j,n) through terminals 421-k and 423-k of SWITCH k (position "1") at input 461-k and receives a value from output 470-k of ADD k at input 462-k.

In repeating step 106, second providing step 102, processing step 103, log$^{-1}$ step 104, and accumulating step 104 are cyclically performed again for substantially all n=1 to n=N.

The use of SWITCH k in accumulating step 104 is hereby optional. A person of skill in the art is able to perform log-steps 122 and 124 in providing steps 101 and 102 in a different way without departing from the scope of the present invention.

(i)

Figure 6A:
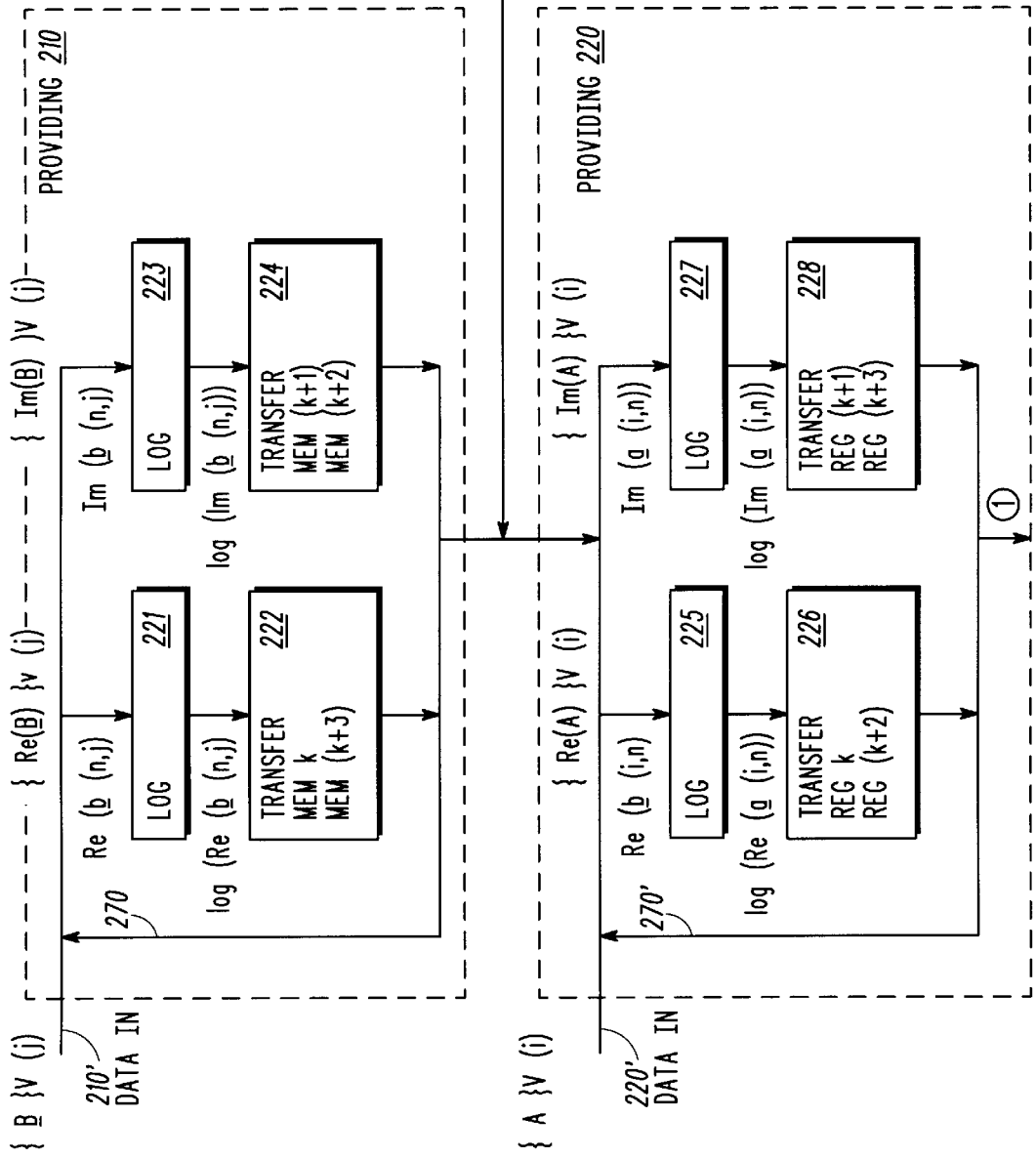
FIGS. 6A–B are a simplified flow chart diagrams illustrating a method of the present invention to calculate one complex element $c(i,j)$ during a complex matrix multiplication $\{\underline{C}\}=\{\underline{A}\}*\{\underline{B}\}$.
Figure 6B:
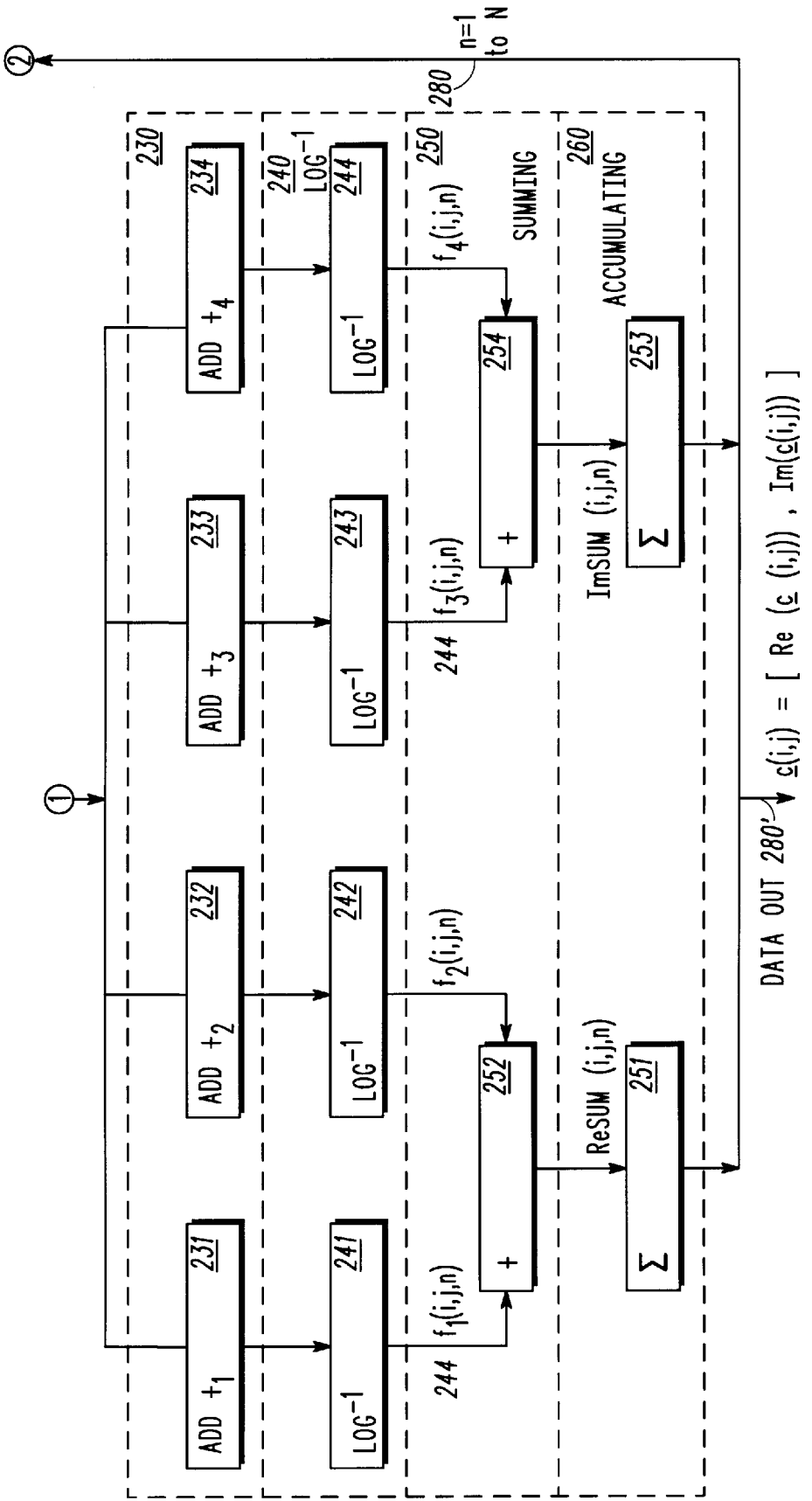

FIGS. 6A–B are a simplified flow chart diagrams illustrating method 200 to calculate one element $\underline{c}(i,j)$ in a complex matrix multiplication $\{\underline{C}\}=\{\underline{A}\}*\{\underline{B}\}$ (equation 26) according to the present invention. By method 200, row vector $\{\underline{A}\}_V(i)$ (equation 16) on "DATA IN" line 220' is multiplied with column vector $\{\underline{B}\}_V(j)$ (equation 17) at "DATA IN" line 210' to element $\underline{c}(i,j)$ on "DATA OUT" line 280'. FIG. 6A and FIG. 6B are connected by placeholders ① and ②. For convenience, method 200 is illustrated in reference to FIGS. 1 and 4. Method 200 uses LOG, busses 401 and 402, DOUBLE k (REG k, REG (k+1), MEM k, MEM (k+1), CU k, CU (k+1), LOG$^{-1}$ k, LOG$^{-1}$ (k+1), SWITCH k, SWITCH (k+1), ADD k, ADD (k+1)) and DOUBLE k+2 (REG (k+2), REG (k+3), MEM (k+2), MEM (k+3), CU (k+2), CU (k+3), LOG$^{-1}$ (k+2), LOG$^{-1}$ (k+3), SWITCH (k+2), SWITCH (k+3), ADD (k+2), ADD (k+3)) as well as busses 401 and 402 of system 400. System 400 operates in a second mode with SWITCH k, (k+1), (k+2), (k+3) at position "2". For better understanding, the reader could refer to the simplified block diagram of system 400 (FIG. 1) with the units referenced with k=1 and (k+1)=2 on the left side (DOUBLE 1) and the units referenced with (k+3)=3 (where FIG. 1 writes k) and (k+3)=4=K (right side, DOUBLE 3).

Method 200 follows equations (28) to (31). Method 200 comprises providing steps 210 and 220 (FIG. 6A), processing step 230, log$^{-1}$ step 240, summing step 250, accumulating step 260 (FIG. 6B), and repeating step 280 (FIGS. 6A–B). Steps 210–260 are illustrated by dashed frames. Providing step 220, processing step 230, log$^{-1}$ step 240, summing step 250, accumulating step 260 are performed in a cycle for n=1 to N (see 280). The steps of method 200 are, preferably, performed in the following order:

In first providing step 210, system 400 receives column vector $\{\underline{B}\}_V(j)$ with its components real part column vector $\{Re(\underline{B})\}_V(j)$ (cf. equation 21) and imaginary part column vector $\{Im(\underline{B})\}_V(j)$ (cf. equation 23). Thereby, system 400 stores logarithmic representations $\log(Re(\underline{b}(n,j)))$ and $\log(Im(\underline{b}(n,j)))$ for n=1 to N in MEM k to MEM (k+3). Details follow. Preferably, providing step 210 comprises log steps 221 and 223 and transferring steps 222 and 224 which are cyclically repeated (line 270) for n=1 to N within providing step 210. In log step 221, LOG receives Re(b(n,j)) and sends log(Re(b(n,j))) via bus 401 or 402 to e.g., REG k and REG (k+3). In transferring step 222, REG k sends log(Re(b(n,j))) to a field (e.g., CELL (n,k) of MEM k and REG (k+3) sends log(Re(b(n,j))) to a field (e.g., CELL (n,(k+3)) of MEM (k+3). Preferably, log step 223 and transfer step 224 can be, substantially performed in parallel to log step 221 and transfer step 222, respectively. In log step 223, LOG receives Im(b(n,j)) and sends log(Im(b(n,j))) via bus 401 or 402 to e.g., REG (k+1) and REG (k+2). In transferring step 224, REG (k+1) sends the negative value of log(Im(b(n,j))) (− sign or "minus") to a field (e.g., CELL (n,(k+1)) of MEM (k+1) and REG (k+2) sends log(Im(b(n,j))) to a field (e.g., CELL (n,(k+2)) of MEM (k+2). The minus-sign originates from equations (7) and (28) and is conveniently introduced here. A person of skill in the art is able, based on the description herein, to consider the minus-sign of (28) also in further steps (such as in processing step 230).

In repetitions of second providing step 220, system 400 receives row vector $\{\underline{A}\}_V(i)$ with its components real part row vector $\{Re(\underline{A})\}_V(i)$ and imaginary part row vector $\{Im(\underline{A})\}_V(i)$. Every time step 220 is performed in a repetition, system 400 stores logarithmic representations $\log(Re(\underline{a}(i,n)))$ and $\log(Im(\underline{a}(i,n)))$ for one n in REG k to REG (k+3). Preferably, providing step 220 comprises log steps 225 and 227 and transferring steps 226 and 228. In log step 225, LOG receives Re($\underline{a}(i,n)$) and sends log(Re($\underline{a}(i,n)$)) to bus 401. In transferring step 226, bus 401 sends log(Re($\underline{a}(i,n)$)) to REG k and to REG (k+2). In log step 227, LOG receives Im($\underline{a}(i,n)$) and sends Im($\underline{a}(i,n)$) to bus 402. In transferring step 228, bus 402 sends Im($\underline{a}(i,n)$) to REG (k+1) and to REG (k+3). Preferably, log step 225 and transfer step 226 can be, substantially performed in parallel to log step 227 and transfer step 228, respectively.

Providing steps 210 and 220 distribute Re and Im among DOUBLE k and DOUBLE (k+1). For example, in MEM k, MEM (k+1) (DOUBLE k), MEM (k+2), and MEM (k+3) (DOUBLE k+1), real and imaginary parts of $\underline{b}(n,j)$ are arranged in a preferred order (e.g., Re, −Im, Im, Re). Similarly, in REG k, REG (k+1) (DOUBLE k), REG (k+2), and REG (k+3), real and imaginary parts of $\underline{a}(i,n)$ alternate, (e.g., Re, Im, Re, Im).

Processing step 230 comprises sub-steps 231, 232, 233, and 234 which are, preferably, performed in parallel by CU k, CU (k+1), (DOUBLE k), CU (k+2) and CU (k+3) (DOUBLE (k+1)). According to equations (22) to (27), logarithmic representations $\log(f_1(i,j,n))$, $\log(f_2(i,j,n))$, $\log(f_3(i,j,n))$, and $\log(f_4(i,j,n))$ are calculated.

Log$^{-1}$-step 240 comprises sub-steps 241, 242, 243, and 244 which are, preferably, performed in parallel by LOG$^{-1}$ k, LOG$^{-1}$ (k+1) (DOUBLE k), LOG$^{-1}$ (k+2), and LOG$^{-1}$ (k+3) (DOUBLE (k+1)). Log$^{-1}$-step 240, provides factors $f_1(i,j,n)$, $f_2(i,j,n)$, $f_3(i,j,n)$, and $f_4(i,j,n)$.

Summing step 250 comprises sub-steps 252 and 254 which are performed, preferably, in parallel by SWITCH (k+1) and ADD (k+1) of DOUBLE k and by SWITCH (k+3) and ADD (k+3) of DOUBLE (k+1), respectively. SWITCH (k+1) in position "2" leads $f_1(i,j,n)$ from LOG$^{-1}$ k to ADD (k+1) and SWITCH (k+3) in position "2" leads $f_3(i,j,n)$ from LOG$^{-1}$ (k+2) to ADD (k+3). ADD (k+1) and ADD (k+3) provide ReSum(i,j,n) and ImSum(ij,n) according to equation (30) and (31), respectively.

Accumulating step 260 comprises sub-steps 251 and 253 which are performed, preferably, in parallel by SWITCH k and ADD k (DOUBLE k) and SWITCH (k+2) and ADD (k+2), respectively. SWITCHES k and (k+2) in position "2" configure ADD k and (k+2) as accumulators. Re($\underline{c}(i,j)$) and Im($\underline{c}(i,j)$) are calculated according to equations (30) and (31), respectively, when steps 220, 230, 240, and 250 are repeated in the cycle from n=1 to N (line 280).

(j)

FIG. 7 is a simplified flow chart diagram illustrating method 201 of the present invention to calculate all elements c(i,j) during the real matrix multiplication $\{C\}=\{A\}*\{B\}$. For convenience, method 201 is explained in reference to the definitions of equations (24), (25), (26), (27), (32) and (33). System 400 uses a number of J computational units SINGLE k. In system 400, one SINGLE k calculates one column vector $\{C\}_V(j)$. It is convenient to assume that J=K and that SINGLE 1 calculates the first column vector $\{C\}_V(1)$ and that SINGLE K calculates the last column vector $\{C\}_V(J)$. But this is not essential for the present invention. For J<K, system 400 can be used partially with only some SINGLE k out of a total number of K SINGLE k participating. Method 201 can in short be described as parallel applying some steps of method 100 to all columns vectors $\{B\}_V(j)$ for j=1 to J to obtain one row vector $\{C\}_V(i)$ of $\{C\}$ and to repeat this application for all row vectors $\{A\}_V(i)$ of $\{A\}$. Method 201 comprises providing steps 101-j (j=1 to J), providing step 102, processing steps 103-j (j=1 to J), $\log^{-1}$ steps 104-j (j=1 to J) and accumulating steps 105-j (j=1 to J). The steps with the j-index are performed, preferably, simultaneously for j=1 to J. FIG. 7 illustrates this feature by overlapping blocks with indices 1, 2, j and J. For simplicity, steps 103-j, 104-j, and 105-j are illustrated in common blocks. Steps 102, 103-j, 104-j, and 105-j are repeated in a first cycle (ine 106 as in method 100) and in a second cycle (line 109).

The steps of method 201 are performed, preferably, in the following order: In steps 101-j, the complete matrix $\{B\}$ with substantially all column vectors $\{B\}_V(j)$ (j=1 to J) is written into MEM 1 (of SINGLE 1) to MEM K (of SINGLE K). In step 102, one element a(i,n) is broadcasted to REG 1 to REG K (of SINGLE 1 to K). Steps 103-j, 104-j, 105-j are performed in SINGLE 1 to SINGLE K as explained in connection with method 100. Steps 102, 103-j, 104-j and 105-j are repeated (line 106) as in method 100. During this first cycle (n=1 to N), one row vector $\{A\}_V(i)$ is used. At the end of the first cycle, one row vector $\{C\}_V(i)=\{c(i,1)\ c(i,2)\ c(i,j)\ldots c(i,J)\}$ (see equation 25) is provided. The first cycle (line 106) is repeated in a second cycle (line 109) for further rows $\{A\}_V(i)$. At the end of the second cycle, matrix $\{C\}$ has been calculated completely.

(k)

FIG. 8 is a simplified flow chart diagram illustrating method 202 of the present invention to calculate all elements C(i,j) during the complex matrix multiplication $\{\underline{C}\}=\{\underline{A}\}*\{\underline{B}\}$. For convenience, method 202 is explained in reference to the definitions of equations (24), (25), (26), and (27). System 400 uses a number of 2*J computational units DOUBLE k (having, preferably odd k). In other words, 2*J DOUBLE or 4*J SINGLE are required (K≧4*J). It is convenient to assume that K=4*J and that DOUBLE 1 calculates real part column vector $\{Re(\underline{C})\}_V(1)$, DOUBLE 3 calculates imaginary part column vector $\{Im(\underline{C})\}_V(1)$ and so on until DOUBLE (K-1) calculates the imaginary part column vector $\{Im(\underline{C})\}_V(J)$. But this is not essential for the present invention. For J*4<K, system 400 can be used partially with only some DOUBLE participating. Method 202 can in short be described as parallel applying some steps of method 200 to all columns vectors $\{\underline{B}\}_V(j)$ for j=1 to J to obtain one row vector $\{\underline{C}\}_V(i)$ of $\{\underline{C}\}$ and to repeat this application for all row vectors $\{\underline{A}\}_V(i)$ of $\{\underline{A}\}$. Method 202 comprises providing steps 210-j (j=1 to J), providing step 220, processing steps 230-j (j=1 to J), $\log^{-1}$ steps 240-j (j=1 to J), summing steps 250-j, and accumulating steps 260-j (j=1 to J). The steps with the j-index are performed, preferably, simultaneously for j=1 to J. FIG. 8 illustrates this feature by overlapping blocks with indices 1, 2, j and J. For simplicity, steps 230-j, 240-j, 250-j and 260-j are illustrated in common blocks.

Steps 220, 230-j, 240-j, 250-j and 260-j are repeated in a first cycle (line 280) as in method 200) and in a second cycle (line 290).

The steps of method 202 are performed, preferably, in the following order: In steps 210-j, the complete matrix $\{\underline{B}\}$ with substantially all column vectors $\{\underline{B}\}_V(j)$ (j=1 to J) is written into MEM 1 to MEM (K+3) for each DOUBLE k. In step 102, one element $\underline{a}(i,n)$ is broadcasted to REG 1 to REG K with, preferably alternating Re and Im. Steps 230-j, 240-j, 250-j and 260-j are performed in as explained in connection with method 200. Steps 220, 230-j, 240-j, 250-j and 260-j are repeated (line 260) as in method 200. During this first cycle (n=1 to N), one row vector $\{\underline{A}\}_V(i)$ is used. At the end of the first cycle, one row vector $\{\underline{C}\}_V(i)=\{c(i,1)\ c(i,2)\ c(i,j)\ldots c(i,J)\}$ (see equation 25) is provided. The first cycle (line 106) is repeated in a second cycle (line 290) for further rows $\{\underline{A}\}_V(i)$. At the end of the second cycle, matrix $\{\underline{C}\}$ has been calculated completely.

(l)

Figure 10:
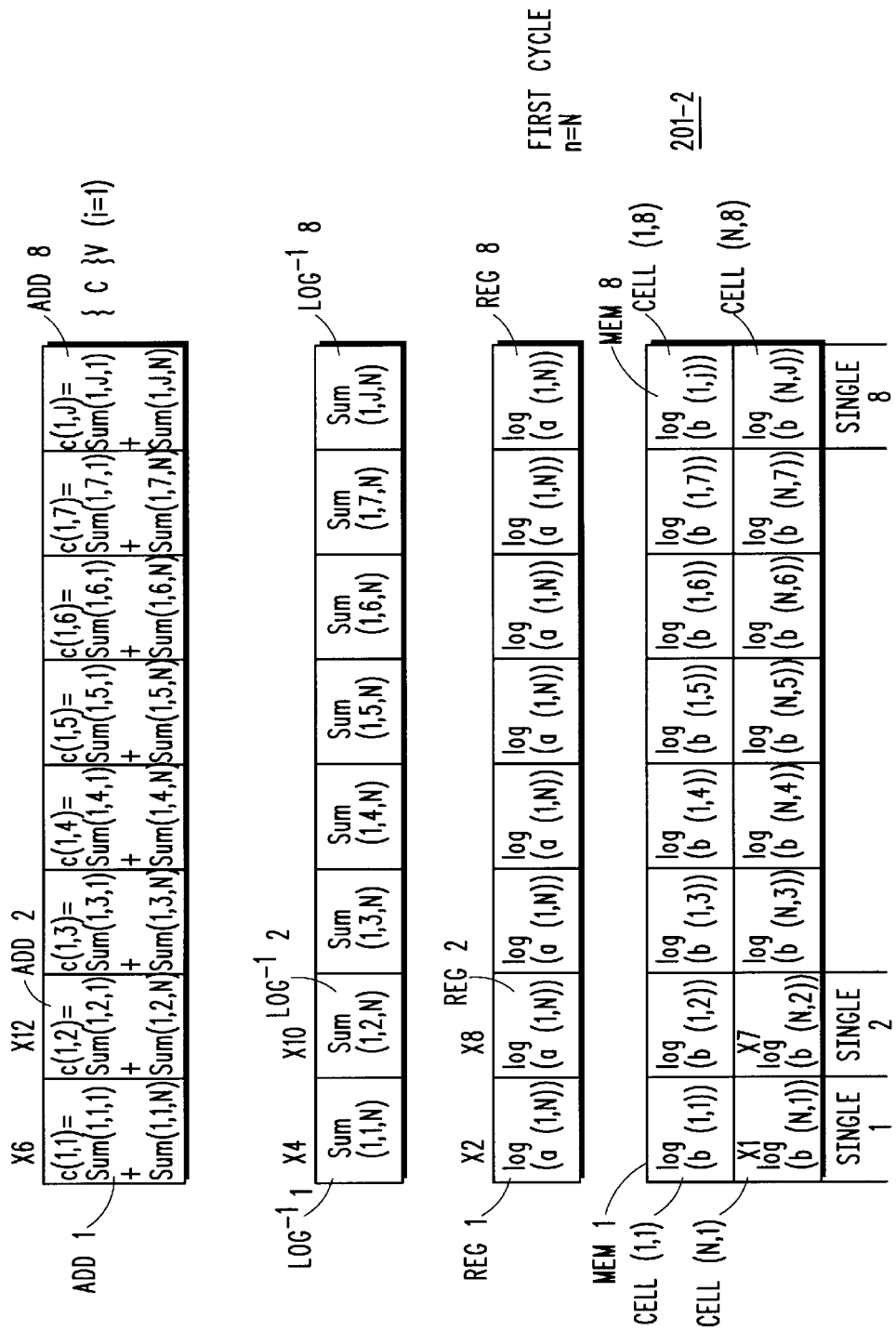
Figure 11:
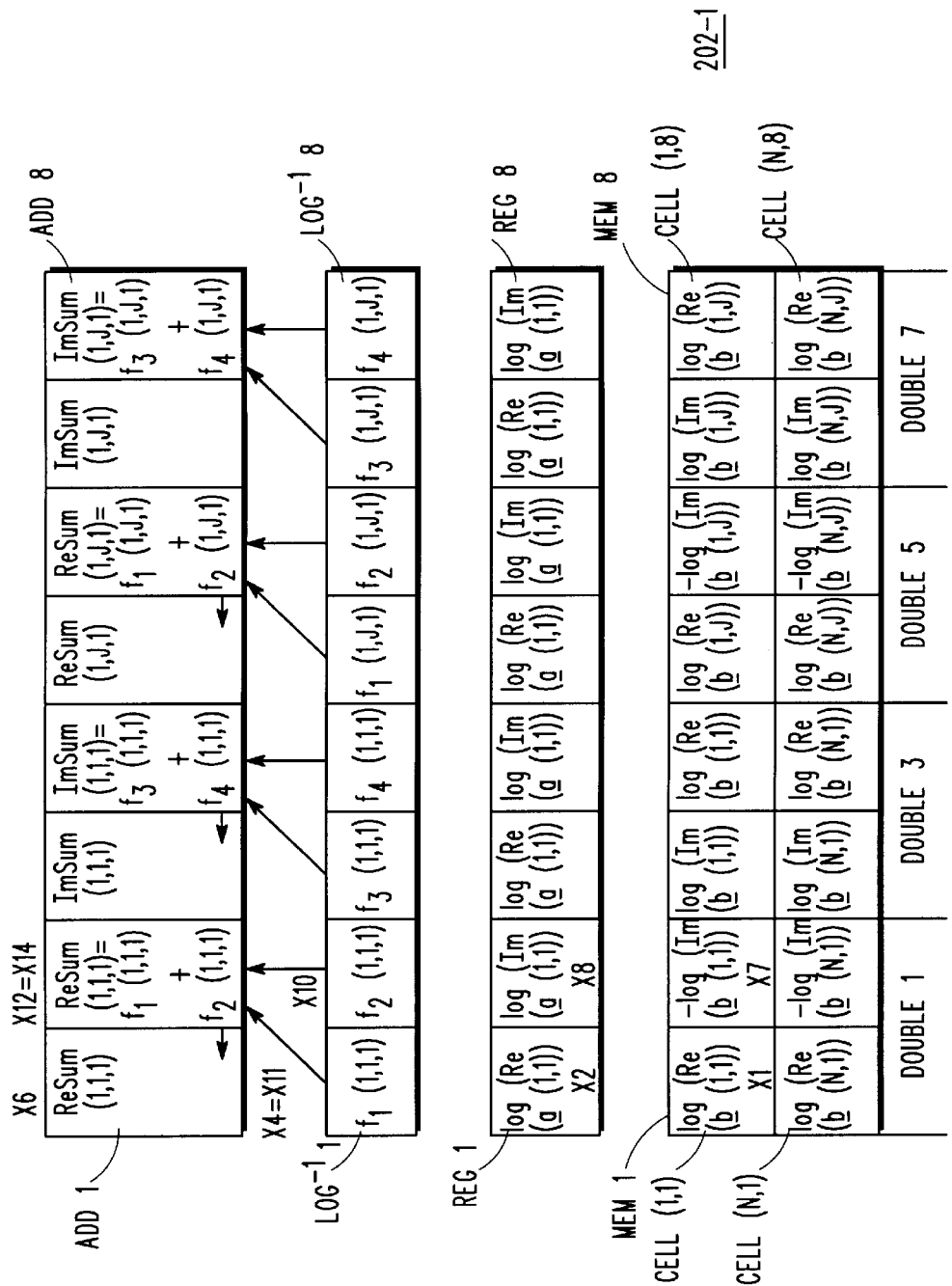
FIGS. 11–14 time-slices for the system of FIG. 1 illustrating the method of FIG. 8 by a second example.
Figure 12:
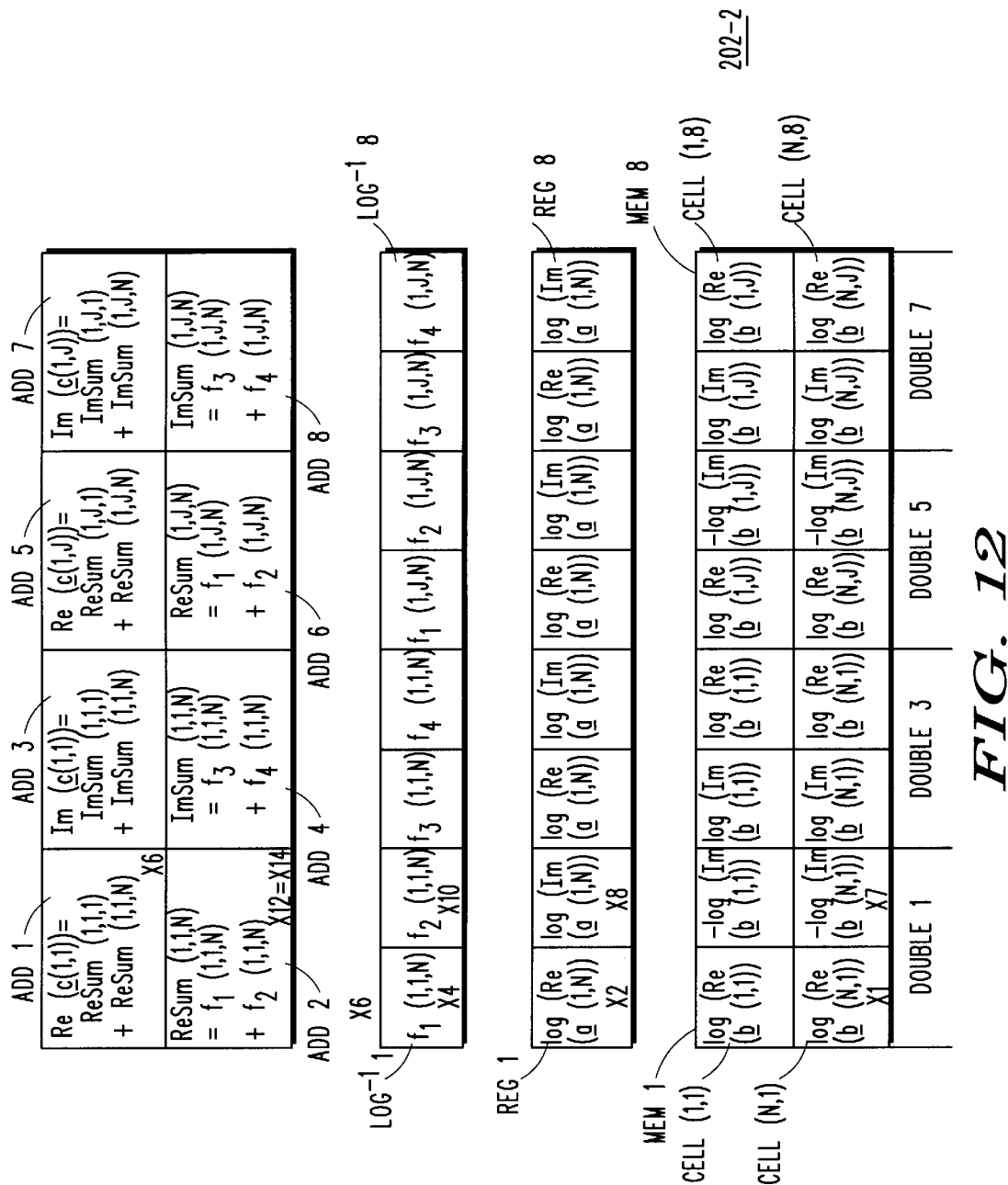
Figure 13:
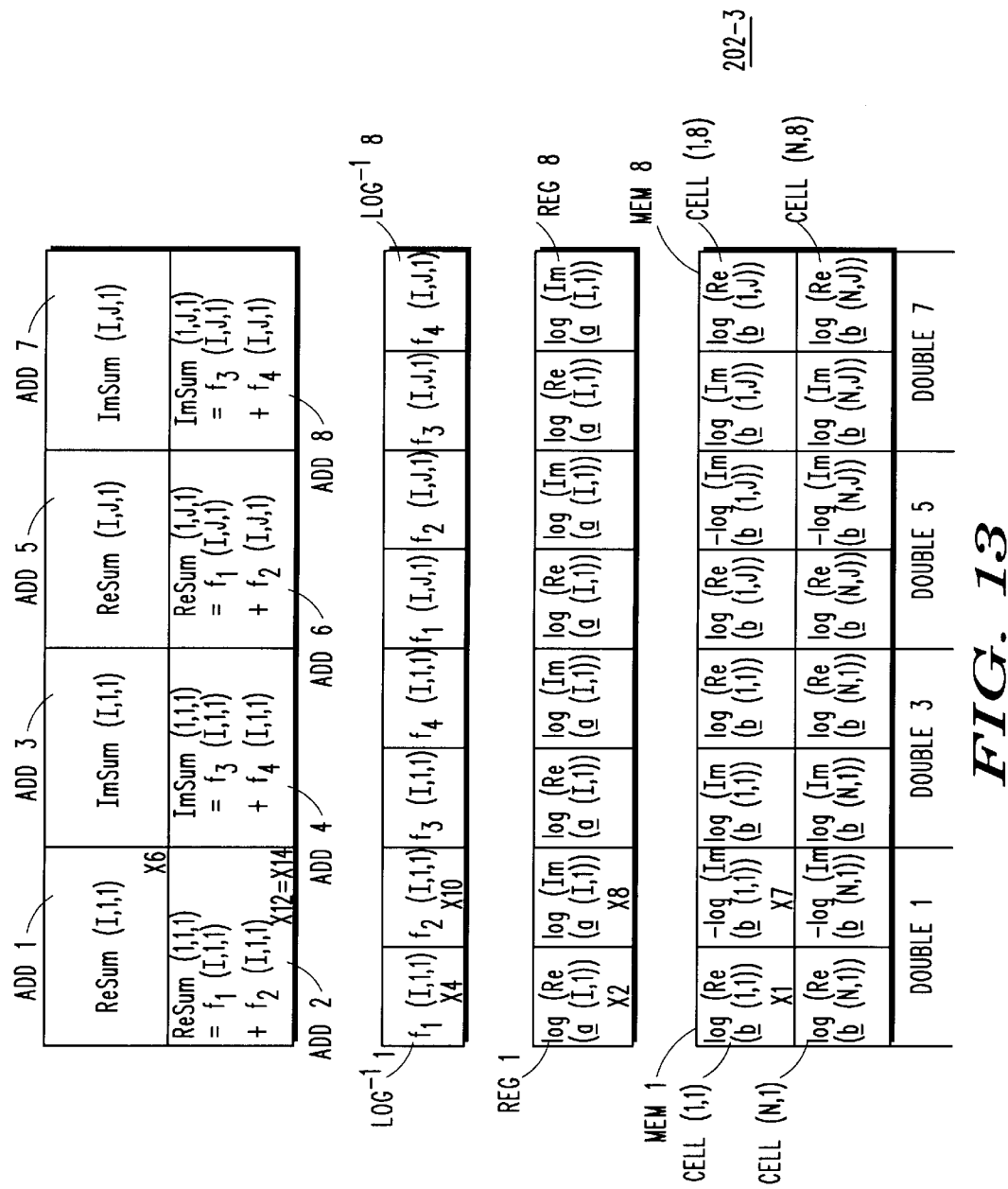
Figure 14:
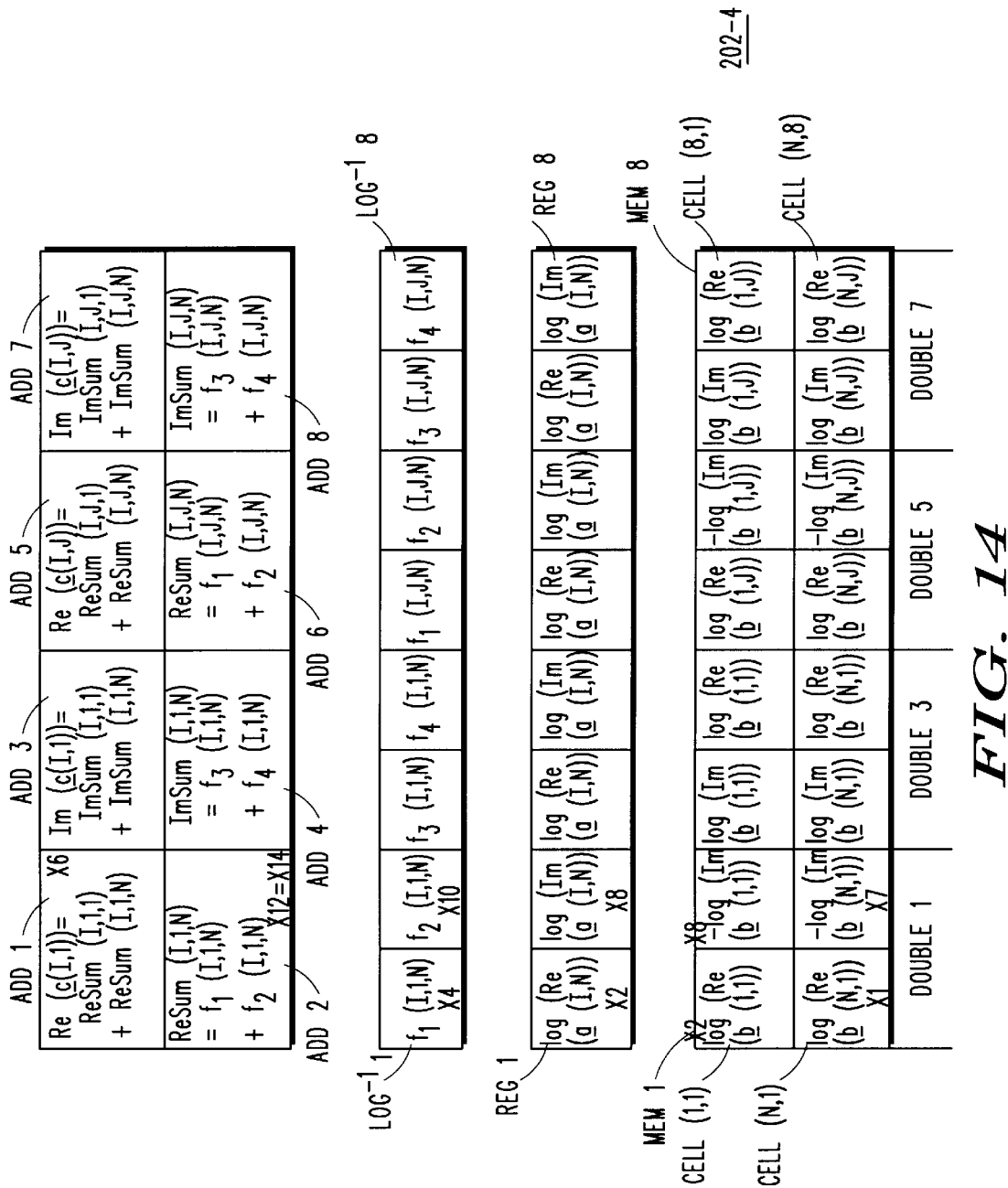

FIGS. 9–10 shows method 201 of the present invention for the first example by time-slices 201-2 to 201-2. FIGS. 9–10 show the contents of MEM k (k=1 to k=J) each having CELL (n,k) (n=1 to N=2) (N=2 rows and J=8 columns), REG 1-8, $\log^{-1}$ 1-8, ADD 1-8. SINGLE k (k=1 to J=8) of system 400 operate in the first mode. In reference to FIGS. 2–3, logic signals are T1=T2="1" and T3=T4="0". Variables X1, X2, X4, X6, X7, X8, X10, and X12 of FIG. 2 are given for SINGLE 1 and SINGLE 2. The other variables (not shown for simplicity) are X3=X1+X2, X5=X4, X9=X7+X8, X11=∅, X13=∅, and X14=∅.

Time slices 201-1 (FIG. 9) and 201-2 (FIG. 10) illustrate the calculation of the first row vector $\{C\}_V(i=1)$ of matrix $\{C\}$. For simplicity, the calculation of the second row vector $\{C\}_V(I=2)$ of matrix $\{C\}$ is not shown. In reference to method 100 of FIG. 5, time-slice 201-1 is taken at the end of accumulating step 105 for n=1 and time slice 201-2 is taken at the end of accumulating step 105 for n=N=2 when c(1,j) is provided.

(m)

FIGS. 11–14 shows method 202 of the present invention for the second example by time-slices 202-1 to 202-4. System 400 operates in the second mode (complex mode) with SWITCH 1 to 8 in position "2". The number of DOUBLE k which are required is J*2=2*2=4 (DOUBLE 1, DOUBLE 3, DOUBLE 5, and DOUBLE 7). FIGS. 10–14 show real numbers which are available at outputs 412-1 to 412-8 of REG 1-8, outputs 452-1 to 452-8 of $\log^{-1}$ 1-8, and outputs 470-1 to 470-8 of ADD 1-8. MEM 1-8 is shown which each MEM having N=2 rows (CELL (1,1) to CELL (N,8)). Time slices 202-1 (FIG. 10) and 202-2 (FIG. 11) illustrate the calculation of the first row vector (i=1) of matrix $\{\underline{C}\}$ and time slices 202-3 (FIG. 12) and 202-4 (FIG. 13) illustrate the calculation if the second row vector (i=I=2) of matrix $\{\underline{C}\}$.

CU 1-4 (see FIG. 3) and their associated components (MEM 1-4, REG 1-4, $\log^{-1}$ 1-4, ADD 1-4, ACCU 1-4), or in other words DOUBLE 1 and 2, calculate element $\underline{c}(1,1)$ of matrix $\{\underline{C}\}$) in two cycles for n=1 (time-slice 202-1) and n=N=2 (time-slice 202-2). CU 5-8 and their associates components (DOUBLE 5 and 7) calculate elements $\underline{c}(1,J)$ of matrix $\{\underline{C}\}$ in the same two clock cycles for n=1 (time-slice 202-1) and n=N=2 (time-slice 202-2). In two further time-slices (202-3 for n=1 and 202-4 for n=N), DOUBLE 1 and 3 calculate element $\underline{c}(I,1)$ and DOUBLE 5 and 7 calculate element $\underline{c}(I,J)$.

Matrix $\{\underline{B}\}$ is loaded (step 210) into MEM 1-8 where it remains during time-slices 202-1 to 202-4 without being changed. $\{\underline{B}\}$ is loaded as:

```
       (belonging to DOUBLE 1)
          log(Re(b(1,1))) in CELL (1,1) of MEM 1,
          log(Re(b(N,1))) in CELL (N,1) of MEM 1,
          –log(Im(b(1,1))) in CELL (1,2) of MEM 2,
          (with "–" for negative representation)
          –log(Im(b(N,1))) in CELL (N,2) of MEM 2,
       (belonging to DOUBLE 3)
          log(Im(b(1,1))) in CELL (1,3) of MEM 3
          log(Im(b(N,1))) in CELL (N,3) of MEM 3,
          log(Re(b(1,1))) in CELL (1,4) of MEM 4
          log(Re(b(N,1))) in CELL (N,4) of MEM 4
```

The other elements of $\{\underline{B}\}$ are loaded into MEM 5-8 in, preferably, a similar way. Elements $\underline{a}(i,n)$ are loaded to REG 1-8 (step 220) as $\underline{a}(1,1)$ in time-slice 202-1, $\underline{a}(1,N)=\underline{a}(1,2)$ in time-slice 202-2, $\underline{a}(I,1)=\underline{a}(2,1)$ in time-slice 202-3, and $\underline{a}(I,N)=\underline{a}(2,2)$ in time-slice 202-4. For convenience of explanation, in FIGS. 7–10, variables X1, X2, X7, X8, X4=X11, X10, X12=X14, and X6 of FIG. 2 are indicated for DOUBLE 1 being a representative example. Referring to equations (46) to (53), the calculation of the elements $\underline{c}(i,j)$ of $\{\underline{C}\}$ is given as follows:

```
       (46) Re(c(1,1)), by DOUBLE 1, during 202-1 and 202-2,
       (47) Re(c(1,J)), by DOUBLE 5, during 202-1 and 202-2,
       (48) Re(c(I,1)), by DOUBLE 1, during 202-3 and 202-4,
       (49) Re(c(I,J)), by DOUBLE 5, during 202-3 and 202-4,
       (50) Im(c(1,1)), by DOUBLE 3, during 202-1 and 202-2,
       (51) Im(c(1,J)), by DOUBLE 7, during 202-1 and 202-2,
       (52) Im(c(I,1)), by DOUBLE 3, during 202-3 and 202-4, and
       (53) Im(c(I,j)), by DOUBLE 7, during 202-3 and 202-4.
```

It will be appreciated that although only one particular embodiment of the invention has been described in detail, various modifications and improvements can be made by a person skilled in the art based on the teachings herein without departing from the scope of the present invention which is properly determined by the claims that follow.

We claim:

1. A method for multiplying a first matrix $\{A\}$ with I*N complex elements $a(i,n)=(Re(a(i,n)), Im(a(i,n)))$ and a second matrix $\{B\}$ with N*J complex elements $b(n,j)=(Re(b(n,j)), Im(b(n,j)))$ to a third matrix $\{C\}$ with I*J complex elements $c(i,j)=(Re(c(i,j)), Im(c(i,j)))$, wherein i=1 to I, j=1 to J, and n=1 to N wherein, a, b, c are complex numbers said method comprising the following steps:

(i) loading $Re(b(n,j))$ and $Im(b(n,j))$ for all n and for all j into a memory array;

(ii) loading $Re(a(i,n))$ and $Im(a(i,n))$ for one i and for all n into registers of a register array;

(iii) simultaneously for all j and for all n providing intermediate results $f_1(i,j,n)=Re(a(i,n))*Re(b(n,j))$ by first multiplication units, $f_2(i,j,n)=-Im(a(i,n))*Im(b(n,j))$ by second multiplication units, $f_3(i,j,n)=Re(a(i,n))*Im(b(n,j))$ by third multiplication units, $f_4(i,j,n)=Im(a(i,n))*Re(b(n,j))$ by fourth multiplication units;

(iv) simultaneously for all j and for all n providing intermediate results $ReSum(i,j,n)=f_1(i,j,n)+f_2(i,j,n)$ by first adders $ImSum(i,j,n)=f_3(i,j,n)+f_4(i,j,n)$ by second adders;

(v) simultaneously for all j accumulating over all n said intermediate results $ReSum(i,j,n)$ to $Re(c(i,j))$ by first accumulators and $ImSum$ to $Im(c(i,j))$ by second accumulators while repeating said steps (ii), (iii), and (iv); and (vi) repeating said steps (ii), (iii), (iv) and (v) for all i.

2. The method of claim 1 wherein in said step (i) for every j, $Re(b(n,j))$ for all n go into a first column of said memory array, $-Im(b(n,j))$ for all n go into a second column of said memory array, $Im(b(n,j))$ for all n go into a third column of said memory array, and $Re(b(n,j))$ for all n go into a fourth column of said memory array.

3. The method of claim 1 wherein in said step (ii), said $a(i,n)$ is loaded alternating with $Re(a(i,n))$ and $Im(a(i,n))$ into adjacent registers of said register array.

4. The method of claim 1 wherein in said step (iii) for each j, said first multiplication units receive $Re(b(n,j))$ from first columns of said memory array, said second multiplication units receive $-Im(b(n,j))$ from second columns, said third multiplication units receive $Im(b(n,j))$ from third columns, and said fourth multiplication units receive $Re(b(n,j))$ from fourth columns, said multiplication units being adjacent for each j.

5. The method of claim 1 wherein in said step (i) said $Re(b(n,j))$ are loaded in two copies at different memory locations and $Im(b(n,j))$ are loaded as $+Im(b(n,j))$ and as $-Im(b(n,j))$ at different memory locations.

6. The method of claim 1 wherein in said step (ii) $Re(a(i,n))$ and $Im(a(i,n))$ are loaded substantially simultaneously via a first bus and via a second bus, respectively.

7. The method of claim 1 wherein in said step (i), $Re(b(n,j))$ and $Im(b(n,j))$ are cyclically first loaded to said register array by busses and second transferred from said register array to said memory array.

8. The method of claim 1 wherein in said steps (i) and (ii) said $Re(a(i,n))$, $Im(a(i,n))$, $Re(b(n,j))$, and $Im(b(n,j))$ are provided in logarithmic form and wherein in said step (iii), said $f_1(i,j,n)$, $f_2(i,j,n)$, $f_3(i,j,n)$ and $f_4(i,j,n)$ are calculated by addition and $\log^{-1}$ operations.

9. An apparatus for performing a complex matrix multiplication $\{C\}=\{A\}*\{B\}$, wherein $\{A\}$ includes (I*N) numbers $a(i,n)=(Re(a(i,n)) \ Im(a(i,n)))$, wherein $\{B\}$ includes (N*J) numbers $b(n,j)=(Re(b(n,j)), Im(b(n,j)))$ and wherein $\{C\}$ includes (I*J) numbers $c(i,j)=(Re(c(i,j)), Im(c(i,j)))$ arranged in I row vectors $\{C\}_r(i)$, said apparatus comprising:

(i) a first plurality of J first groups, each of said first groups having (2*N)+2 memory locations a first multiplication unit coupled to said memory locations for providing $f_1(i,j,n)=Re(a(i,n))*Re(b(n,j))$, a second multiplication unit coupled to said memory locations for providing $f_2(i,j,n)=-Im(a(i,n))*Im(b(n,j))$, a first adder coupled to said first and second multiplication units for providing $ReSum(i,j,n)=f_1(i,j,n)+f_2(i,j,n)$, a first accumulator coupled to said first adder for accumulating $ReSum(i,j,n)$ to $Re(c(i,j))$; and (ii) a second plurality of J second groups, each of said second groups having (2*N)+2 memory locations a third multiplication unit coupled to said memory locations for providing $f_3(i,j,n)=Re(a(i,n))*Im(b(n,j))$, a fourth multiplication unit coupled to said memory locations for providing $f_4(i,j,n)=Im(a(i,n))*Re(b(n,j))$, a second adder coupled to said third and fourth multiplication units for providing ImSum (i,j,n)= $f_3$ (i,j,n)+$f_4$ (i,j,n), a second accumulator coupled to said second adder for accumulating ImSum (i,j,n) to Im(c(i,j)), said apparatus providing all c(i,j) of one row vector $\{C\}_{\gamma}(i)$ at substantially one time by said first groups and by said second group after having calculated Re(c(i,j)) and Im(c(i,j)) in cycles with substantially all n=1 to N, said apparatus providing a complete matrix $\{C\}$ by repeating the calculation of row vector $\{C\}_{\gamma}(i)$ for substantially all i=1 to I.

10. The apparatus of claim 9 wherein said memory locations store said Re(a(i,n)), Im(a(i,n)), Re(b(n,j)), and Im(b(n,j)) in logarithmic representations and wherein each of said first, second, third and fourth multiplication units has a fifth, sixth, seventh, and eighth adder, respectively, and a first, second, third, and fourth $\log^{-1}$ unit.

11. The apparatus of claim 9 wherein said first and second accumulators are implemented by adder units, each having first inputs, second inputs, and outputs, and wherein said first inputs are coupled to said outputs via switches.

12. The apparatus of claim 9 with J=16.

13. The apparatus of claim 9 further having a first bus and a second bus for providing said numbers, said first bus being coupled to that of said memory locations which store Re(b(n,j)), Im(b(n,j)) and Re(a(i,n)) and said second bus being coupled to that of said memory locations which store −Im(b(n,j)), Re(b(n,j)) and Im(a(i,n)).

* * * * *